US012648007B2

(12) United States Patent
Elshafie et al.

(10) Patent No.: US 12,648,007 B2
(45) Date of Patent: Jun. 2, 2026

(54) TECHNIQUES FOR DELAY STATUS REPORTING VIA SIDELINKS

(71) Applicant: QUALCOMM Incorporated, San Diego, CA (US)

(72) Inventors: Ahmed Elshafie, San Diego, CA (US); Diana Maamari, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 18/448,716

(22) Filed: Aug. 11, 2023

(65) Prior Publication Data

US 2025/0056582 A1 Feb. 13, 2025

(51) Int. Cl.
*H04W 72/40* (2023.01)
*H04W 72/1263* (2023.01)
*H04W 88/04* (2009.01)

(52) U.S. Cl.
CPC ....... *H04W 72/40* (2023.01); *H04W 72/1263* (2013.01); *H04W 88/04* (2013.01)

(58) Field of Classification Search
CPC . H04W 72/40; H04W 72/1263; H04W 88/04; H04W 76/14
See application file for complete search history.

(56) References Cited

U.S. PATENT DOCUMENTS

| | | | | |
|---|---|---|---|---|
| 2017/0353819 A1* | 12/2017 | Yin | ........................ | H04W 72/21 |
| 2021/0144582 A1* | 5/2021 | Yi | ..................... | H04W 28/0278 |
| 2023/0171826 A1* | 6/2023 | Selvanesan | ........... | H04W 76/14 370/310 |

* cited by examiner

*Primary Examiner* — Rushil P. Sampat

(74) *Attorney, Agent, or Firm* — Holland & Hart LLP

(57) ABSTRACT

Methods, systems, and devices for wireless communications are described. In some examples, a relay user equipment (UE) may transmit control signaling indicating a set of sidelink resources for transmission of one or more delay status reports (DSRs) from one or more remote UEs to the relay UE. The relay UE may receive, via the set of sidelink resources, a first sidelink message including a first DSR from a first remote UE, a second DSR from a second remote UE, or both, where the first DSR is associated with a first logical channel between the first remote UE and a network entity and the second DSR is associated with a second logical channel between the second remote UE and the network entity. Based on receiving the DSRs, the relay UE may transmit, to the network entity via uplink resources, an uplink message including the first DSR and the second DSR.

30 Claims, 12 Drawing Sheets

1 Bit

| LCG 305-b | ... | ... | ... | ... | ... | ... | LCG 305-a |
|---|---|---|---|---|---|---|---|

310-a

| ... | ... | ... | ... | ... | ... | ... | ... |
|---|---|---|---|---|---|---|---|

310-b

| Quantity of Data in the LCG 305-a at Sampling Instance |
|---|

310-c

| Duration Between Sampling Instance for LCG 305-a |
|---|

310-d

| Quantity of Data in the LCG 305-b at Sampling Instance |
|---|

310-e

| Duration Between Sampling Instance for LCG 305-b |
|---|

310-f

300

1 Bit

| UE 115-h | UE 115-g | ... | ... | ... | ... | UE 115-f | UE 115-e |
|---|---|---|---|---|---|---|---|

310-a

| DSR for UE 115-e |
|---|

310-b

| DSR for UE 115-f |
|---|

310-c

| DSR for UE 115-g |
|---|

310-d

| DSR for UE 115-h |
|---|

310-e

301

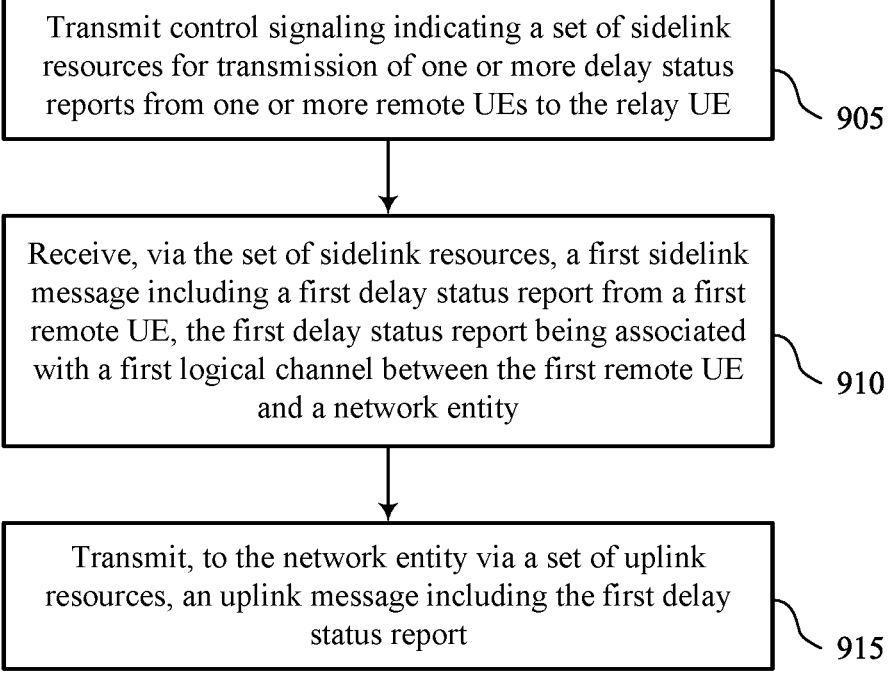

Transmit control signaling indicating a set of sidelink resources for transmission of one or more delay status reports from one or more remote UEs to the relay UE

905

Receive, via the set of sidelink resources, a first sidelink message including a first delay status report from a first remote UE, the first delay status report being associated with a first logical channel between the first remote UE and a network entity

910

Transmit, to the network entity via a set of uplink resources, an uplink message including the first delay status report

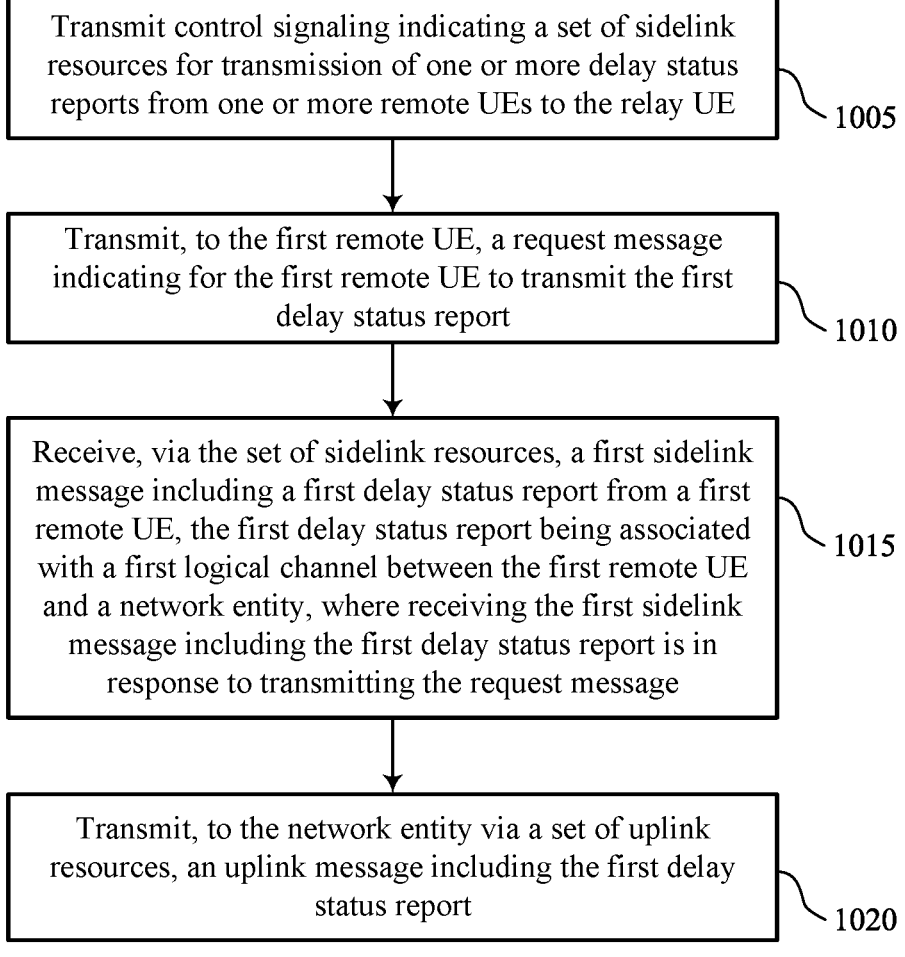

Transmit control signaling indicating a set of sidelink resources for transmission of one or more delay status reports from one or more remote UEs to the relay UE

⎰ 1005

Transmit, to the first remote UE, a request message indicating for the first remote UE to transmit the first delay status report

⎰ 1010

Receive, via the set of sidelink resources, a first sidelink message including a first delay status report from a first remote UE, the first delay status report being associated with a first logical channel between the first remote UE and a network entity, where receiving the first sidelink message including the first delay status report is in response to transmitting the request message

⎰ 1015

Transmit, to the network entity via a set of uplink resources, an uplink message including the first delay status report

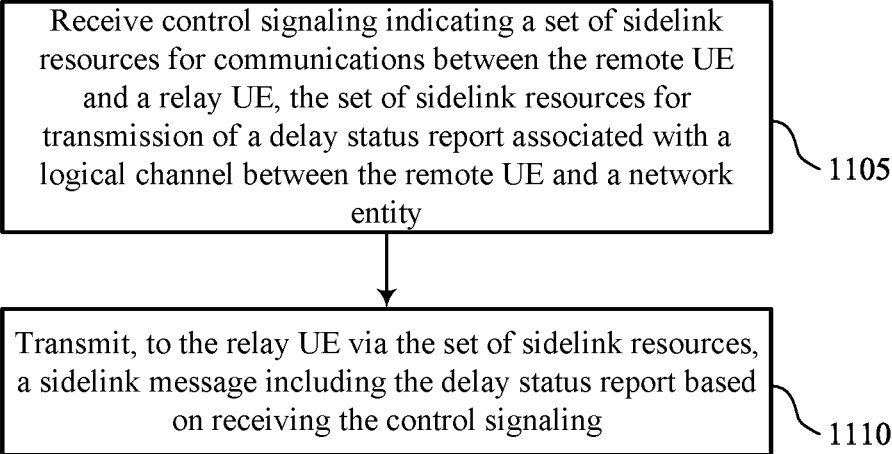

Receive control signaling indicating a set of sidelink resources for communications between the remote UE and a relay UE, the set of sidelink resources for transmission of a delay status report associated with a logical channel between the remote UE and a network entity

1105

Transmit, to the relay UE via the set of sidelink resources, a sidelink message including the delay status report based on receiving the control signaling

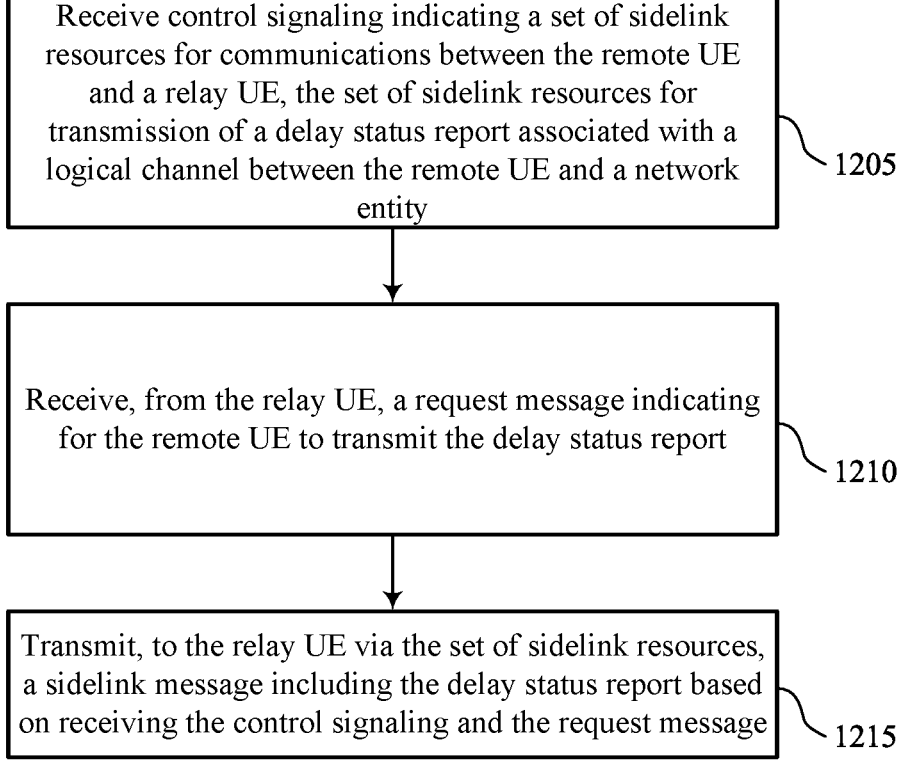

Receive control signaling indicating a set of sidelink resources for communications between the remote UE and a relay UE, the set of sidelink resources for transmission of a delay status report associated with a logical channel between the remote UE and a network entity

1205

Receive, from the relay UE, a request message indicating for the remote UE to transmit the delay status report

1210

Transmit, to the relay UE via the set of sidelink resources, a sidelink message including the delay status report based on receiving the control signaling and the request message

TECHNIQUES FOR DELAY STATUS REPORTING VIA SIDELINKS

FIELD OF TECHNOLOGY

The following relates to wireless communications, including techniques for delay status reporting via sidelinks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for delay status reporting via sidelinks. For example, the described techniques enable a relay user equipment (UE) to forward delay status reports (DSRs) from multiple remote UEs to a network entity, such that the network entity may schedule sidelink resources for the remote UEs based on the DSRs. For example, the relay UE may transmit control signaling (e.g., sidelink control information (SCI)) indicating a set of sidelink resources for transmission of one or more DSRs from one or more remote UEs to the relay UE. The relay UE may receive, via the set of sidelink resources, a first sidelink message including a first DSR from a first remote UE, a second DSR from a second remote UE, or both, where the first DSR is associated with a first logical channel (LCH) or first logical channel group (LCG) between the first remote UE and a network entity and the second DSR is associated with a second LCH or a second LCG between the second remote UE and the network entity. In some examples, based on receiving the DSRs, the relay UE may transmit, to the network entity via uplink resources, an uplink message including both the first DSR and the second DSR Alternatively, the relay UE may forward (e.g., transmit) the first DSR and the second DSR via respective uplink messages.

A method for wireless communications by a relay UE is described. The method may include transmitting control signaling indicating a set of sidelink resources for transmission of one or more DSRs from one or more remote UEs to the relay UE, receiving, via the set of sidelink resources, a first sidelink message including a first DSR from a first remote UE, the first DSR being associated with a first LCH between the first remote UE and a network entity, and transmitting, to the network entity via a set of uplink resources, an uplink message including the first DSR.

A relay UE for wireless communications is described. The relay UE may include one or more memories storing processor executable code, and one or more processors coupled with the one or more memories. The one or more processors may individually or collectively operable to execute the code to cause the relay UE to transmit control signaling indicating a set of sidelink resources for transmission of one or more DSRs from one or more remote UEs to the relay UE, receive, via the set of sidelink resources, a first sidelink message including a first DSR from a first remote UE, the first DSR being associated with a first LCH between the first remote UE and a network entity, and transmit, to the network entity via a set of uplink resources, an uplink message including the first DSR.

Another relay UE for wireless communications is described. The relay UE may include means for transmitting control signaling indicating a set of sidelink resources for transmission of one or more DSRs from one or more remote UEs to the relay UE, means for receiving, via the set of sidelink resources, a first sidelink message including a first DSR from a first remote UE, the first DSR being associated with a first LCH between the first remote UE and a network entity, and means for transmitting, to the network entity via a set of uplink resources, an uplink message including the first DSR.

A non-transitory computer-readable medium storing code for wireless communications is described. The code may include instructions executable by a processor to transmit control signaling indicating a set of sidelink resources for transmission of one or more DSRs from one or more remote UEs to the relay UE, receive, via the set of sidelink resources, a first sidelink message including a first DSR from a first remote UE, the first DSR being associated with a first LCH between the first remote UE and a network entity, and transmit, to the network entity via a set of uplink resources, an uplink message including the first DSR.

Some examples of the method, relay UE, and non-transitory computer-readable medium described herein may further include operations, features, means, or instructions for transmitting, to the network entity, a scheduling request for a second set of sidelink resources between the relay UE and the first remote UE based on the first DSR satisfying a DSR threshold.

Some examples of the method, relay UE, and non-transitory computer-readable medium described herein may further include operations, features, means, or instructions for transmitting the uplink message including the first DSR may be based on the first DSR satisfying the DSR threshold.

Some examples of the method, relay UE, and non-transitory computer-readable medium described herein may further include operations, features, means, or instructions for receiving, via the set of sidelink resources, a second sidelink message including a second DSR from a second remote UE, the second DSR associated with a second LCH between the second remote UE and the network entity.

Some examples of the method, relay UE, and non-transitory computer-readable medium described herein may further include operations, features, means, or instructions for transmitting, via the set of uplink resources, a second uplink message including the second DSR to the network entity.

In some examples of the method, relay UE, and non-transitory computer-readable medium described herein, transmitting the uplink message may include operations, features, means, or instructions for transmitting, to the network entity, a medium access control-control element (MAC-CE) including a concatenation of the first DSR and the second DSR.

Some examples of the method, relay UE, and non-transitory computer-readable medium described herein may further include operations, features, means, or instructions for receiving, from the network entity, an uplink grant indicating the set of uplink resources, where transmitting the uplink message including the first DSR may be based on receiving the uplink grant.

Some examples of the method, relay UE, and non-transitory computer-readable medium described herein may further include operations, features, means, or instructions for transmitting, to the first remote UE, a request message indicating for the first remote UE to transmit the first DSR, where receiving the first sidelink message including the first DSR may be in response to transmitting the request message.

In some examples of the method, relay UE, and non-transitory computer-readable medium described herein, the request message further indicates that the first DSR may be for the first LCH.

Some examples of the method, relay UE, and non-transitory computer-readable medium described herein may further include operations, features, means, or instructions for receiving downlink control information (DCI) requesting the first DSR from the first remote UE, the DCI including the set of sidelink resources, the set of uplink resources, or both, where transmitting the control signaling may be based on receiving the DCI.

In some examples of the method, relay UE, and non-transitory computer-readable medium described herein, the set of sidelink resources may be periodic.

In some examples of the method, relay UE, and non-transitory computer-readable medium described herein, the first DSR indicates at least a remaining delay budget (RDB) for a packet data unit (PDU) session associated with the first LCH at the first remote UE, and the RDB may be a difference between a packet delay budget of the PDU session and a quantity of elapsed time from reception of the PDU session at an uplink buffer of the first remote UE.

A method for wireless communications by a remote UE is described. The method may include receiving control signaling indicating a set of sidelink resources for communications between the remote UE and a relay UE, the set of sidelink resources for transmission of a DSR associated with a LCH between the remote UE and a network entity and transmitting, to the relay UE via the set of sidelink resources, a sidelink message including the DSR based on receiving the control signaling.

A remote UE for wireless communications is described. The remote UE may include one or more memories storing processor executable code, and one or more processors coupled with the one or more memories. The one or more processors may individually or collectively operable to execute the code to cause the remote UE to receive control signaling indicating a set of sidelink resources for communications between the remote UE and a relay UE, the set of sidelink resources for transmission of a DSR associated with a LCH between the remote UE and a network entity and transmit, to the relay UE via the set of sidelink resources, a sidelink message including the DSR based on receiving the control signaling.

Another remote UE for wireless communications is described. The remote UE may include means for receiving control signaling indicating a set of sidelink resources for communications between the remote UE and a relay UE, the set of sidelink resources for transmission of a DSR associated with a LCH between the remote UE and a network entity and means for transmitting, to the relay UE via the set of sidelink resources, a sidelink message including the DSR based on receiving the control signaling.

A non-transitory computer-readable medium storing code for wireless communications is described. The code may include instructions executable by a processor to receive control signaling indicating a set of sidelink resources for communications between the remote UE and a relay UE, the set of sidelink resources for transmission of a DSR associated with a LCH between the remote UE and a network entity and transmit, to the relay UE via the set of sidelink resources, a sidelink message including the DSR based on receiving the control signaling.

Some examples of the method, remote UE, and non-transitory computer-readable medium described herein may further include operations, features, means, or instructions for receiving, from the relay UE, a request message indicating for the remote UE to transmit the DSR, where transmitting the sidelink message including the DSR may be in response to receiving the request message.

In some examples of the method, remote UE, and non-transitory computer-readable medium described herein, the request message further indicates that the DSR may be for the LCH.

Some examples of the method, remote UE, and non-transitory computer-readable medium described herein may further include operations, features, means, or instructions for transmitting, to the relay UE, a scheduling request for the set of sidelink resources, where receiving the control signaling may be in response to transmitting the scheduling request.

Some examples of the method, remote UE, and non-transitory computer-readable medium described herein may further include operations, features, means, or instructions for receiving an indication of a RDB threshold, where transmitting the sidelink message including the DSR may be based on a RDB of a PDU session of the LCH satisfying the RDB threshold.

Some examples of the method, remote UE, and non-transitory computer-readable medium described herein may further include operations, features, means, or instructions for receiving an indication of a periodic timer associated with the transmission of the DSR, where transmitting the sidelink message including the DSR may be based on expiration of the periodic timer.

Some examples of the method, remote UE, and non-transitory computer-readable medium described herein may further include operations, features, means, or instructions for transmitting the sidelink message including the DSR may be based on a packet error rate associated with the LCH satisfying a packet error rate threshold, a quantity of discarded packets associated with the LCH satisfying a threshold quantity of discarded packets, or both.

In some examples of the method, remote UE, and non-transitory computer-readable medium described herein, the set of sidelink resources may be periodic.

In some examples of the method, remote UEs, and non-transitory computer-readable medium described herein, the DSR indicates at least a RDB for a PDU session associated with the LCH at the remote UE, and the RDB may be a difference between a packet delay budget of the PDU session and a quantity of elapsed time from reception of the PDU session at an uplink buffer of the remote UE.

BRIEF DESCRIPTION OF THE DRAWINGS

FIGS. 9 through 12 show flowcharts illustrating methods that support techniques for delay status reporting via sidelinks in accordance with one or more aspects of the present disclosure.

DETAILED DESCRIPTION

In some wireless communications systems, a user equipment (UE) may transmit a delay status report (DSR) to indicate delay information associated with uplink communications between the UE and a network entity. For example, the UE may indicate a remaining delay budget (RDB) for a packet data unit (PDU) session at the UE to the network entity via the DSR. As such, the network entity may schedule uplink resources for the UE based on the indications received via the DSR, such that the UE may meet, or otherwise satisfy, latency metrics associated with uplink packets in the buffer of the UE.

In some cases, the UE may communicate with the network entity via a relay UE, where the UE may be referred to as a remote UE. In such cases, however, current techniques may not enable the remote UE to report the DSR to the network entity via the relay UE, resulting in the network entity being unable to schedule sidelink resources between the remote UE and the relay UE and uplink resources between the relay UE and the network entity according to a DSR of the remote UE. As such, the network entity may allocate sidelink and uplink resources for the sidelink relay communications that are unable to meet the latency metrics associated with various data packets at the remote UE, leading to a loss of data.

The techniques described herein may enable delay status reporting for remote UEs via sidelinks. For example, the relay UE may transmit control signaling (e.g., sidelink control information (SCI)) that indicates sidelink resources for one or more remote UEs to transmit respective DSRs. The relay UE may receive, from a first remote UE, a first sidelink message including a first DSR and also receive, from a second remote UE, a second sidelink message including a second DSR. Upon receipt of the first and second DSRs, the relay UE may combine (e.g., concatenate) the first and second DSRs into a group based DSR and forward the group based DSR to a network entity. Alternatively, the UE may transmit each DSR via separate messages to the network entity.

In response to receiving the respective DSRs, the network entity may schedule resources for the sidelink communications (e.g., both uplink and sidelink resources) for use by the relay UE and each remote UE based on the respective DSRs. In this way, each remote UE may communicate with the network entity via the relay UE with resources that are allocated according to the respective DSRs, thereby enabling each UE to satisfy the latency metrics associated with data packets in the buffer of the UEs.

Aspects of the disclosure are initially described in the context of wireless communications systems. Aspects of the disclosure are further described in the context of DSRs and process flows. Aspects of the disclosure are further illustrated by and described with reference to apparatus diagrams, system diagrams, and flowcharts that relate to techniques for delay status reporting via sidelinks.

Figure 1:
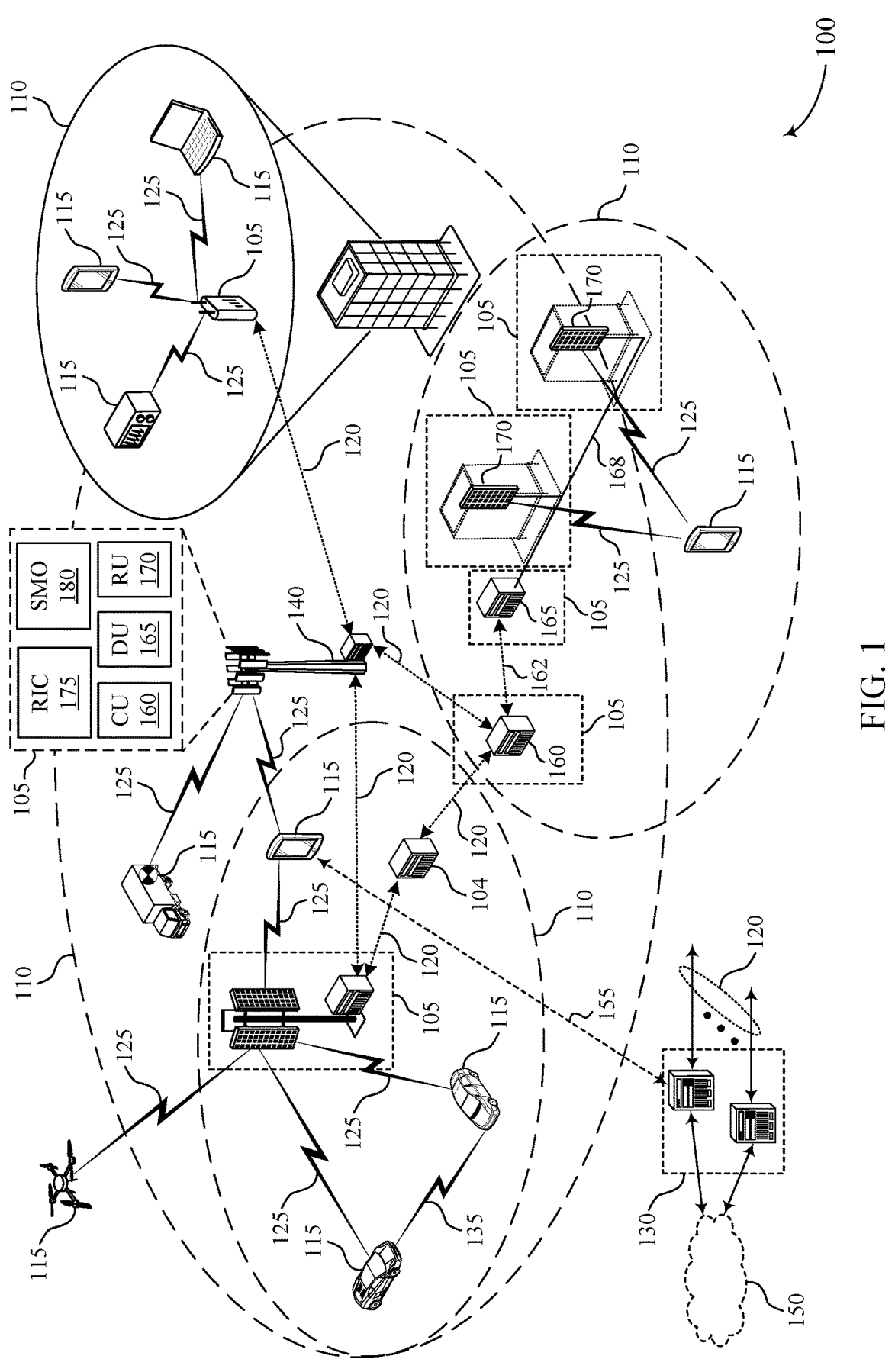
FIG. 1 shows an example of a wireless communications system that supports techniques for delay status reporting via sidelinks in accordance with one or more aspects of the present disclosure.

FIG. 1 shows an example of a wireless communications system 100 that supports techniques for delay status reporting via sidelinks in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for delay status reporting via sidelinks as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes function as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the UE 115 may transmit a DSR to indicate delay information associated with uplink communications between the UE 115 and a network entity 105. For example, the UE 115 may report at least an RDB for a PDU or PDU set at the UE 115 to the network entity 105 via the DSR. As such, the network entity 105 may schedule uplink resources for the UE 115 based on the indications received via the DSR, such that the UE 115 may satisfy the latency metrics associated with uplink packets in the buffer of the UE 115.

In some cases, the UE 115 may communicate with the network entity 105 via a relay UE 115, where the UE 115 may be referred to as a remote UE 115. In such cases, however, current techniques may not enable the remote UE 115 to report the DSR to the network entity 105 via the relay UE 115, resulting in the network entity 105 being unable to schedule sidelink resources between the remote UE 115 and the relay UE 115 and uplink resources between the relay UE 115 and the network entity 105 according to a DSR of the remote UE 115. As such, the network entity 105 may allocate sidelink and uplink resources for the sidelink relay communications that are unable to satisfy the latency metrics associated with various data packets at the remote UE 115, leading to a loss of data.

The techniques described herein may enable delay status reporting for sidelink remote UEs 115. For example, the relay UE 115 may transmit control signaling that indicates sidelink resources for one or more remote UEs 115 to use to transmit respective DSRs. The relay UE 115 may receive, from a first remote UE 115, a first sidelink message (e.g., MAC-control element (MAC-CE), SCI, or the like) including a first DSR and also receive, from a second remote UE 115, a second sidelink message including a second DSR. Upon receipt of the first and second DSRs, the relay UE 115 may combine (e.g., concatenate) the first and second DSRs into a single group based DSR and forward the single group based DSR to a network entity. Alternatively, the UE 115 may transmit each DSR via separate messages to the network entity.

In response to receiving the respective DSRs, the network entity 105 may schedule resources for the sidelink communications (e.g., both uplink and sidelink resources) for use by the relay UE 115 and each remote UE 115 based on the respective DSRs. In this way, each remote UE 115 may communicate with the network entity 105 via the relay UE 115 with resources that are allocated according to the respective DSRs, thereby enabling each UE 115 to meet, or otherwise satisfy, the latency metrics associated with data packets in the buffer of the UEs 115.

Figure 2:
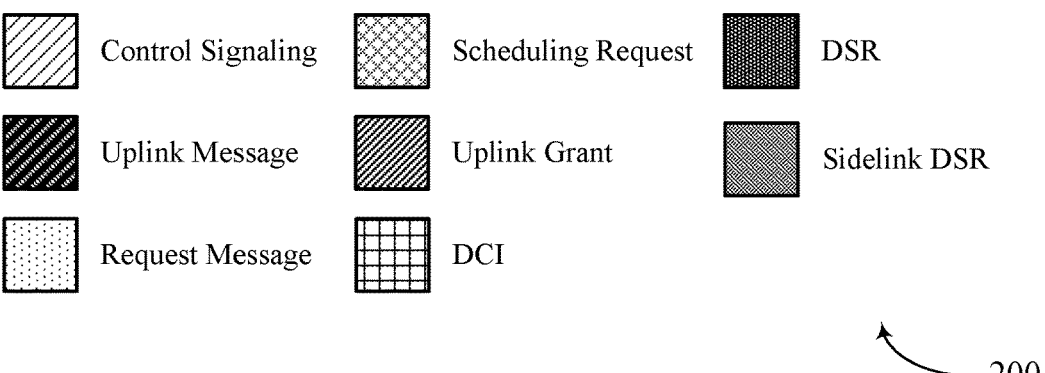
FIG. 2 shows an example of a wireless communications system that supports techniques for delay status reporting via sidelinks in accordance with one or more aspects of the present disclosure.

FIG. 2 shows an example of a wireless communications system 200 that supports techniques for delay status reporting via sidelinks in accordance with one or more aspects of the present disclosure. Aspects of the wireless communications system 200 may implement, or be implemented by, aspects of the wireless communications system 100 as described herein with reference to FIG. 1. For example, the wireless communications system 200 may include a network entity 105-a, which may be an example of the network entities 105 described herein. Further, the wireless communications system 200 may include a UE 115-a, a UE 115-b, and a UE 115-c, which may be examples of UEs 115 described herein. The techniques described in the context of the wireless communications system 200 may enable, for example, the UE 115-b to transmit a DSR 220 to the network entity 105-a via the UE 115-a.

In some cases, the UE 115-a may transmit an uplink message 205 to the network entity 105-a, where the uplink message 205 may include data associated with one or more applications with relatively strict latency metrics (e.g., delay sensitive data traffic, such as extended reality (XR) applications). To facilitate the communication of such data, the UE 115-a may periodically transmit a buffer status report (BSR) to indicate at least a packet delay budget (PDB) 210 for the data at the UE 115-a, such that the network entity 105-a may schedule resources for the uplink message 205 according to the PDB 210. However, in such cases, the network entity 105-a may not be able to efficiently schedule resources for the data traffic based on the PDB 210 alone.

For example, the PDB 210 may indicate a quantity of time from when a PDU (e.g., a data packet) arrives in an uplink buffer of the UE 115-a until a delivery deadline for the PDU (e.g., surpassing the deadline may render the data of the PDU invalid). However, in such cases, the PDB 210 may not indicate a quantity of time from when the network entity 105-a receives an indication of the existence of the PDU from the BSR. That is, currently, the network entity 105-a may not be able to know the RDB 215 of the buffered PDU (e.g., how much time the uplink data has left before the delivery deadline is surpassed) and determine when the delay budget of the buffered PDU will deplete, as the BSR sent from the UE 115-*a* may not indicate how much data is buffered for how long. Thus, the PDB 210 alone may not provide the intended scheduling enhancements, and instead, the indication of at least the RDB 215 may be desirable, such that the network entity 105-*a* may determine how quickly to provide uplink grants to the UE 115-*a*.

As such, the UE 115-*a* may transmit, to the network entity 105-*a*, a DSR 220 that indicates at least the RDB 215 of one or more PDUs, such that the network entity 105-*a* may efficiently schedule uplink resources for uplink transmissions with relatively strict latency metrics (e.g., XR data). For example, the UE 115-*a* may dynamically report the RDB 215 of a PDU session in the layer 2 buffer of the UE 115-*a*, where the RDB 215 is defined as the difference between the PDB 210 of a PDU session (e.g., as associated with a quality of service (QOS) flow) and an elapsed time 225 since the PDU session was received at the service data adaptation protocol (SDAP) layer of the UE 115-*a*. The RDB 215 may be equal to the difference between the PDB 210 of the PDU session and the elapsed time 225 since the PDU session arrived at the uplink buffer of the UE 115-*a*, where the elapsed time 225 may be equal to the difference between the current operating time of the UE 115-*a* and the arrival time of the PDU session at the uplink buffer of the UE 115-*a*.

In some cases (e.g., if a QoS flow has a varying frame rate), the UE 115-*a* may not be able to signal nominal arrival times and delivery deadlines for each PDU or PDU set. As such, the network entity 105-*a* may use a fixed delay budget while scheduling uplink resources, which may result in relatively conservative deadlines being inadvertently applied to the PDU sessions. To remedy this, the UE 115-*a* may also provide, via the DSR 220 or a separate report, a statistical DSR (e.g., delay statistics, such as the average, standard deviation, or the like of the RDB 215 across multiple PDUs), which may enable the network entity 105-*a* to adapt the delay budgets applied when scheduling resources in order to compensate for the inefficiency.

For example, in downlink communications, the UE 115-*a* may measure the RDB 215 (e.g., amount of delay budget left before the delivery deadline) of a PDU or PDU set and then provide such statistics to the network entity 105-*a*. As such, if the RDB 215 is relatively large, the network entity 105-*a* may increase the delay budget applied while scheduling the resources. Alternatively, if the RDB 215 is relatively small, the network entity 105-*a* may decrease the delay budget applied while scheduling the resources in order to meet the deadlines of the various PDU sessions.

In uplink communications, the UE 115-*a* may measure the quantity of delay experienced by a PDU or PDU set when it is successfully received by the network entity 105-*a* (e.g., based on reception of a positive radio link control (RLC) status report) and report such statistics to the network entity 105-*a*. The network entity 105-*a* may use the statistics of the delay to estimate the RDB 215 for the rest of the connection (e.g., end-to-end delay budget provisioned for the PDU subtracted by the delay reported by the UE 115-*a*). In some cases, the network entity 105-*a* may configure the UE 115-*a* to measure and report downlink, uplink, or both delay statistics for selected data radio bearers (DRBs) of a PDU session.

In some examples, the UE 115-*a* may be triggered to transmit the DSR 220 (e.g., Uu or uplink DSR). For example, the network entity 105-*a* may configure one or more logical channel groups (LCGs) (e.g., one or more logical channels (LCH)) for which the UE 115-*a* should report the DSR 220. In such examples, the transmission of the DSR 220 for the configured LCGs may be event triggered or timer triggered, where such events and timers may be configured per LCG. That is, the UE 115-*a* may receive an indication of a first set of events, a first timer, or both that may be used to trigger the DSR 220 for a first LCG and also receive an indication of a second set of events, a second timer, or both that may be used to trigger the DSR 220 for a second LCG. In this way, the network entity 105-*a* may configure different triggers for transmission of DSR 220 for different LCGs at the UE 115-*a*.

For event triggered delay status reporting, the network entity 105-*a* may configure a reporting threshold on the RDB 215. As such, the UE 115-*a* may trigger transmission of the DSR 220 if the minimum RDB 215 among all PDUs in the configured LCG satisfy the threshold. For timer triggered delay status reporting, the network entity 105-*a* may configure a periodic timer, such that at the expiration of the periodic timer, the UE 115-*a* may transmit the DSR 220. Such thresholds and periodic timers may be preconfigured, where the network entity 105-*a* may select one of the events from the preconfigured thresholds and periodic timers.

In some cases, in response to a trigger or request, the UE 115-*a* may have various pending DSRs 220. As such, the triggered DSRs 220 may remain pending until transmission of the DSR via a MAC-CE included in a physical uplink shared channel (PUSCH). For example, the UE 115-*a* may trigger a DSR 220 for a first LCG and a DSR 220 for a second LCG. In such examples, both the DSRs 220 for the first and second LCG may remain pending at the UE 115-*a* until the UE 115-*a* transmits the DSRs 220 to the network entity 105-*a*. In such cases, if the UE 115-*a* has a pending DSR 220, then the UE 115-*a* may trigger transmission of a scheduling request 230-*a* to request uplink resources until the DSR 220 is no longer pending (e.g., either canceled or transmitted). That is, a pending DSR at the UE 115-*a* may trigger the scheduling request 230-*a* until canceled.

In some cases, one or more remote UEs 115, such as the UE 115-*b* or the UE 115-*c*, may communicate with the network entity 105-*a* via the UE 115-*a*. In such cases, however, current techniques may not enable the remote UEs 115 to report sidelink DSRs 235 to the network entity 105-*a* via the UE 115-*a*, resulting in the network entity 105-*a* being unable to schedule sidelink resources between the remote UEs 115 and the UE 115-*a* and uplink resources between the UE 115-*a* and the network entity 105-*a* according to the sidelink DSRs 235 of the remote UEs 115. That is, there may be no mechanisms to support delay status reporting on the sidelink. As such, the network entity 105-*a* may allocate sidelink and uplink resources for the sidelink relay communications that are unable to meet the latency metrics associated with various PDU sessions at the remote UEs 115, leading to a loss of data.

In accordance with the techniques described herein, the UE 115-*a* may be enabled to relay one or more sidelink DSRs 235 from the remote UEs 115 to the network entity 105-*a*. Such sidelink delay status reporting may enable the UE 115-*a* (e.g., relay UE) and the network entity 105-*a* to enhance scheduling. As an illustrative example, the UE 115-*b* may have a PDU session associated with tight delays. As such the UE 115-*b* may be given priority in the scheduling based on a sidelink DSR 235-*a* reported by the UE 115-*b*.

In some examples, the trigger conditions used by the UE 115-*a* to transmit the DSR 220 via the Uu link may be applied to sidelink delay status reporting (e.g., remote or PC5 links). For example, the UE 115-*b* may trigger the transmission of the sidelink DSR 235-*a* based on an event based trigger, a timer based trigger, or both, where such event based triggers or timer based triggers may be configured per LCG at the UE 115-*b*. For example, in the case of event triggered sidelink delay status reporting, the network entity 105-*a* may configure a respective RDB threshold for a PDU or PDU set of each LCG at the UE 115-*b*. As such, the UE 115-*b* may trigger transmission of the sidelink DSR 235-*a* if the minimum RDB 215 among all PDUs in an LCG is below the respective RDB threshold for the LCG.

As an illustrative example, the UE 115-*b* may receive, from the network entity 105-*a*, from the UE 115-*a*, or both, an indication of the respective RDB thresholds for each LCG at the UE 115-*b*. In such examples, the UE 115-*b* may compare each RDB 215 from the PDUs of a first LCG to a first RDB threshold associated with the first LCG. If a minimum RDB 215 of all the RDBs 215 among the PDUs of the first LCG satisfies the first RDB threshold, then the UE 115-*b* may trigger delay status reporting for the first LCG. In this way, the UE 115-*b* may trigger the sidelink DSR 235-*a* for various LCGs based on respective RDB thresholds.

Additionally, or alternatively, for timer based triggers, the network entity 105-*a* may configure a respective periodic timer for each LCG at the UE 115-*b*, such that upon expiration of one of the respective periodic timers, the UE 115-*b* may trigger the sidelink DSR 235-*a* for the associated LCG. As an illustrative example, the UE 115-*b* may receive, from the network entity 105-*a*, from the UE 115-*a*, or both, an indication of the respective periodic timers for each LCG at the UE 115-*b*. In such examples, if a first periodic timer associated with a first LCG expires, then the UE 115-*b* may trigger delay status reporting for the first LCG. In this way, the UE 115-*b* may trigger the sidelink DSR 235-*a* for various LCGs based on respective periodic timers.

In some examples, the UE 115-*b* may trigger the sidelink DSR 235-*a* based on a packet error rate (PER) of a PDU at the UE 115-*b* satisfying a PER threshold, a quantity of discarded packets of a PDU satisfying a threshold quantity of discarded packets, or both. Such thresholds may be preconfigured or dynamically configured and indicated by the network entity 105-*a*. Further, similar to the RDB threshold and periodic timers, each LCG at the UE 115-*b* may have a corresponding PER threshold, a threshold quantity of discarded packets, or both.

As an illustrative example, the UE 115-*b* may receive an indication of a first PER threshold associated with PDUs of a first LCG and a second PER threshold associated with PDUs of a second LCG. As such, the UE 115-*b* may compare the PER for the PDUs of the first LCG to the first PER threshold and compare the PER for the PDUs of the second LCG to the second PER threshold. The UE 115-*b* may trigger the sidelink DSR 235-*a* for the first LCG based on one or more PDUs of first LCG having a PER that satisfies the first PER threshold. Similarly, the UE 115-*b* may trigger the sidelink DSR 235-*a* for the second LCG based on one or more PDUs of the second LCG having a PER that satisfies the second PER threshold.

Such operations may be extended to the threshold quantity of discarded packets. For example, the UE 115-*b* may trigger the sidelink DSR 235-*a* for a first LCG based on a quantity of discarded packets satisfying a threshold quantity of discarded packets, where the threshold may be configured for, or otherwise associated with, the first LCG.

Based on triggering the transmission of the sidelink DSR 235-*a* for an LCG, the UE 115-*b* may maintain the sidelink DSR 235-*a* for the LCG pending until transmission of the sidelink DSR 235-*a*. That is, until the UE 115-*b* receives a sidelink grant that may be used to transmit the sidelink DSR 235-*a*, the triggered sidelink DSR 235-*a* may remain pending until the UE 115-*b* transmits the sidelink DSR 235-*a* via a MAC-CE included in a physical sidelink shared channel (PSSCH) to the UE 115-*a*.

To facilitate the transmission of the sidelink DSR 235-*a*, the UE 115-*b* may transmit the sidelink DSR 235-*a* via a MAC-CE over an available PSSCH resource (e.g., sidelink resource) without triggering a scheduling request 230-*b*. In one example, the PSSCH resource may be pre-configured. For example, the UE 115-*b* may receive control signaling 240-*a* from the UE 115-*a* that pre-configures a set of PSSCH resources for use in sidelink delay status reporting. As such, based on internal triggers of the sidelink DSR 235-*a*, the UE 115-*a* may select an available PSSCH resource from the set of PSSCH resources and transmit the sidelink DSR 235-*a*. As described herein, the set of PSSCH resources may be periodic PSSCH resources. As such, if multiple sidelink DSRs 235-*a* are triggered at the UE 115-*b* in various time slots, the UE 115-*b* may select available PSSCH resources from the set of periodic PSSCH resources for the transmission of the multiple sidelink DSRs 235-*a* according to the indicated periodicity. In this way, the UE 115-*b* may transmit the sidelink DSR 235-*a* without transmission of a scheduling request 230-*b*.

In another example, the PSSCH resource may be dynamically scheduled. For example, based on triggering the sidelink DSR 235-*a*, the UE 115-*b* may transmit the scheduling request 230-*b* to request a sidelink grant for transmission of the sidelink DSR 235-*a*. In response to receiving the scheduling request 230-*b*, the UE 115-*a* may transmit, via the control signaling 240-*a*, an indication of PSSCH resources for the transmission of the sidelink DSR 235-*a*. As such, the UE 115-*b* may transmit the sidelink DSR 235-*a* to the UE 115-*a* via the indicated PSSCH resources. In this way, the UE 115-*b* may transmit the sidelink DSR 235-*a* in accordance with dynamic scheduling.

As described herein, the UE 115-*a* may relay one or more sidelink DSRs 235 from multiple remote UEs 115. For example, in addition to communications with the UE 115-*b*, the UE 115-*a* may also communicate and relay traffic for the UE 115-*c*. As such, the UE 115-*a* may also transmit control signaling 240-*b* to the UE 115-*c* to dynamically schedule or preconfigure PSSCH resources for transmission of a triggered sidelink DSR 235-*b*.

In response to receiving one or more multiple sidelink DSRs 235, the UE 115-*a* may trigger the transmission of the DSR 220 that includes the sidelink DSRs 235. That is, the reception of the one or more sidelink DSRs 235 from the remote UEs 115 may trigger the UE 115-*a* to transmit the scheduling request 230-*a* requesting uplink resources to forward the sidelink DSRs 235-*a* to the network entity 105-*a* via the Uu interface (e.g., uplink connection). Thus, in such examples, the UE 115-*a* may request resources to forward each sidelink DSR 235 received from the UE 115-*b*, the UE 115-*c*, or both in response to receiving the sidelink DSRs.

Additionally, or alternatively, based on reception of the one or multiple sidelink DSRs 235, the UE 115-*a* may trigger the transmission of the scheduling request 230-*a* in order to request a sidelink grant for the sidelink communications between the UE 115-*a* and the one or more remote UEs 115. In such examples, the UE 115-*a* may transmit the scheduling request 230-*a* based on whether the RDB 215 indicated via the one or more sidelink DSRs 235 satisfy a RDB threshold, which may indicate tight latency metrics.

As an illustrative example, the UE 115-a may receive, via a first PSSCH resource, the sidelink DSR 235-a indicating a first RDB 215. In response to receiving the sidelink DSR 235-a, the UE 115-a may compare the first RDB 215 indicated in the sidelink DSR 235-a to the RDB threshold. If the first RDB 215 is satisfies the RDB threshold, then the UE 115-a may transmit the scheduling request 230-a requesting a sidelink grant for the sidelink communications between the UE 115-a and the UE 115-b, such that the UE 115-b may receive sidelink resources in order to transmit the PDU session. In such examples, the UE 115-a may receive, from the network entity 105-a, an indication of PSSCH resources for sidelink communications between the UE 115-a and the UE 115-b.

In some examples, based on reception of the one or more multiple sidelink DSRs 235, the UE 115-a may trigger the transmission of the DSR 220 including the one or more sidelink DSRs 235 based on whether the RDB 215 indicated via the one or more sidelink DSRs 235 satisfy the RDB threshold. That is, the UE 115-a may transmit the scheduling request 230-a requesting uplink resources for forwarding of the sidelink DSRs 235 based on whether the RDB 215 of the one or more sidelink DSRs 235 satisfy the RDB threshold.

In response to transmitting the scheduling request 230-a for the uplink resources, the UE 115-a may receive an uplink grant 245 indicating uplink resources for the transmission of the one or more sidelink DSRs 235 to the network entity 105-a. After reception of the uplink grant 245, the UE 115-a may forward the one or more sidelink DSRS 235 to the network entity 105-a. If the UE 115-a receives a single sidelink DSR 235, then the UE 115-a may transmit a single MAC-CE that includes the sidelink DSR 235 to the network entity 105-a, where the DSR of the single MAC-CE may be an example of the DSR 300 as described herein with reference to FIG. 3A.

Alternatively, if the UE 115-a receives the sidelink DSR 235-a from the UE 115-b and receives the sidelink DSR 235-b from the UE 115-c, then the UE 115-a may transmit respective MAC-CEs including the respective sidelink DSRs 235 to the network entity 105-a. For example, the UE 115-a may transmit the sidelink DSR 235-a to the network entity 105-a via a first MAC-CE using the same format as the DSR 300 as described herein (e.g., the Uu DSR) and transmit the sidelink DSR 235-b to the network entity 105-a via a second MAC-CE also using the same format as the DSR 300.

In some other examples, the UE 115-a may transmit the sidelink DSR 235-a and the sidelink DSR 235-b via the same MAC-CE using a format as described with reference to the DSR 301 of FIG. 3B. For example, in response to receiving the sidelink DSR 235-a and the sidelink DSR 235-b, the UE 115-a may combine (e.g., concatenate) the sidelink DSR 235-a and the sidelink DSR 235-b into a group based DSR and transmit the group based DSR to the network entity 105-a. Such DSR formats may be further described herein with reference to FIG. 3A and FIG. 3B.

In some examples, the UE 115-b may transmit the sidelink DSR 235-a aperiodically (e.g., transmit an aperiodic DSR (A-DSR)). For aperiodic delay status reporting, the UE 115-a (e.g., otherwise known as a transmitting or relay UE) may transmit a request message 250 requesting the sidelink DSR 235-a from the UE 115-b. In response to receiving the request message 250, the UE 115-b may generate the sidelink DSR 235-a (e.g., calculate the RDBs 215 for a PDU or PDU set for one or more LCGs) and transmit the sidelink DSR 235-a to the UE 115-a to report the experienced delay at the UE 115-b. In such examples, the UE 115-b may transmit the sidelink DSR 235-a to the UE 115-a via uplink control information (UCI), SCI, or a MAC-CE.

The UE 115-a may receive the sidelink DSR 235-a in response to transmitting the request message 250 and forward the sidelink DSR 235-a to the network entity 105-a to facilitate scheduling for the PDU sessions at the UE 115-b. As described herein, if the UE 115-a transmits multiple request messages 250 to one or more remote UEs 115 and, in response, receives multiple sidelink DSRs 235, then the UE 115-a may combine (e.g., concatenate) each sidelink DSR 235 into a group based DSR (e.g., the DSR 301) forward the group based DSR to the network entity 105-a to facilitate scheduling for each of the remote UEs 115. Alternatively, the UE 115-a may forward each of the sidelink DSRs 235 via respective MAC-CEs.

In some examples, the UE 115-a may include, via the request message 250, which LCH or LCG for which the UE 115-b is to transmit the sidelink DSR 235-a. In such examples, the network entity 105-a may configure which LCH should be reported via the sidelink DSR 235-a and indicate such a request to the UE 115-a. In response, the UE 115-a may include the configured LCG in the request message 250. Alternatively, the network entity 105-a may directly indicate, to the UE 115-b via higher layer signaling, which LCG or LCH should be reported via the sidelink DSR 235-a.

Further, in some examples, the remote UEs 115 may transmit the sidelink DSRs 235 in response to a network triggered delay status reporting. For example, the network entity 105-a may transmit DCI 255 to the UE 115-a to request sidelink delay status reporting via the Uu link. For example, the network entity 105-a may transmit, via the DCI 255, a request to receive the sidelink DSR 235 from one or more remote UEs 115. In such examples, the network entity 105-a may include identifiers of remote UEs 115 from which the network entity 105-a requests the sidelink DSRs 235. Further, in such examples, the network entity 105-a may indicate, via the DCI 255, a sidelink grant for transmission of the sidelink DSR 235 from the one or more remote UEs 115 to the UE 115-a. Additionally, or alternatively, the network entity 105-a may also indicate, via the DCI 255, an uplink grant for forwarding the sidelink DSRs 235 from the UE 115-a to the network entity 105-a in the case that the sidelink DSRs 235 are forwarded to the network entity 105-a.

As an illustrative example, the network entity 105-a may transmit DCI 255 to the UE 115-a indicating for the UE 115-b to transmit the sidelink DSR 235-a. In such examples, the DCI 255 may include a sidelink grant indicating PSSCH resources for the transmission of the sidelink DSR 235-a from the UE 115-b to the UE 115-a. Further, in such examples, the DCI 255 may include an uplink grant indicating uplink resources for forwarding the sidelink DSR 235-a from the UE 115-a to the network entity 105-a.

In response to receiving the DCI 255, the UE 115-a may transmit the request message 250 to request the transmission of the sidelink DSR 235-a. In such examples, the request message 250 may include an indication of the PSSCH resources indicated via the DCI. Further, if the DCI 255 includes a request for delay status reporting for a first LCG, then the UE 115-a may indicate, via the request message 250, for the UE 115-b to transmit the sidelink DSR 235-a for the first LCG. The UE 115-b may generate the sidelink DSR 235-a and transmit, via the indicated PSSCH resources, the sidelink DSR 235-a to the UE 115-a. In some examples, if the UE 115-*a* is to forward the sidelink DSR 235-*a* to the network entity 105-*a*, then the UE 115-*a* may forward the sidelink DSR 235-*a* to the network entity 105-*a* via the uplink resources indicated via the DCI 255.

In response to receiving the sidelink DSRs 235 forwarded from the UE 115-*a*, the network entity 105-*a* may be able to schedule uplink and PSSCH resources for the PDU sessions at the remote UEs 115 based on the respective sidelink DSRs 235. In this way, the network entity 105-*a* may be able to schedule such resources according to the RDB 215 of the LCGs at each remote UE 115, thereby providing for increased coordination and improved scheduling.

Figures 3A, 3B:
FIG. 3A and FIG. 3B show examples of delay status reports that support techniques for delay status reporting via sidelinks in accordance with one or more aspects of the present disclosure.

FIG. 3A and FIG. 3B show examples of a DSR 300 and a DSR 301, respectively, that support techniques for delay status reporting via sidelinks in accordance with one or more aspects of the present disclosure. The DSR 300 and the DSR 301 may be implemented by aspects of the wireless communications system 100 and the wireless communications system 200 as described herein with reference to FIGS. 1 and 2.

FIG. 3A. The DSR 300 may be an example of a DSR that is transmitted from a remote UE 115 to a relay UE 115, from relay UE 115 to a network entity 105, or from a UE 115 to a network entity 105, as described herein with reference to FIG. 2. The DSR 300 may include respective DSRs for various LCGs 305 at a UE 115. For example, the DSR 300 may include multiple octets 310 (e.g., 8 bits). An octet 310-*a* of the DSR 300 may be a bitmap indicating the LCGs 305 for which the UE 115 is reporting the DSR. Each bit within the octet 310-*a* may be associated with a respective LCG 305, such that the least significant bit (LSB) of the octet 310-*a* may be associated with an LCG 305-*a*, while the most significant bit (MSB) of the octet 310-*a* may be associated with the LCG 305-*b*. As such, to indicate that the UE 115 is reporting the DSR for the LCG 305-*a*, the UE 115 may set the bit of the octet 310-*a* corresponding the LCG 305-*a* to a logical '1'. In some examples, if the UE 115 is combining the DSR and the BSR into a single report, the UE 115 may include a BSR table bitmap in the octet 310-*b*, where the bitmap for the BSR may indicate for which LCGs 305 the UE 115 is reporting the BSR.

The DSR for each LCG 305 may span at least two octets 310 of the DSR 300. The first octet 310 (e.g., otherwise denoted as S$_i$) of the DSR may indicate a quantity of data in the reported LCG 305 at a sampling instance (e.g., a time at which the quantity of data in the reported LCG was taken). In such examples, the first octet (e.g., S$_i$) may be encoded using BSR tables (e.g., legacy or otherwise). The second octet 310 (e.g., otherwise denoted as Ti) for the DSR may be a duration between the sampling instance and the transmission time of the DSR 300 in a physical uplink shared channel (PUSCH) in a unit of slots. Such a duration may have a threshold value of 32 milliseconds multiplied by 8 slots per millisecond. In some examples, the UE 115 may report one of two options for the sampling instance. In a first option, the UE 115 may set the sampling instance as the slot when the DSR was triggered at the UE 115. Alternatively, in a second option, the sampling instance may be set to a time that corresponds to when the MAC PDU containing the direction was assembled at the UE 115, which may be a more accurate sampling instance than that of the first option.

As an illustrative example, the UE 115 may receive an indication to report the DSR for the LCG 305-*a*. As such, the UE 115 may set the bit of the octet 310-*a* corresponding to the LCG 305-*a* in the DSR 300 to a logical '1'. Accordingly, the UE 115 may transmit, via an octet 310-*c* and an octet 310-*d* of the DSR 300 the DSR for the LCG 305-*a*. Likewise, the UE 115 may also receive an indication to report the DSR for the LCG 305-*b*. As such, the UE 115 may set the bit in the octet 310-*a* that corresponds to the LCG 305-*b* to a logical '1'. The UE 115 may transmit the DSR for the LCG 305-*b* via an octet 310-*e* and an octet 310-*f* based on setting the bit corresponding to the LCG 305-*b* in the octet 310-*a* to a logical '1'. In this way, the UE 115 may transmit the DSR 300 indicating DSRs for various LCGs 305 at the UE 115.

FIG. 3B. The DSR 301 may be an example of a group based DSR that is transmitted from a relay UE 115 to a network entity 105 as described herein with reference to FIG. 2. The DSR 301 may include respective DSRs for various remote UEs 115. For example, as described herein, the relay UE 115 may receive multiple DSRs (e.g., such as multiple DSRs 300) from multiple remote UEs 115. In some examples, the relay UE 115 may concatenate the DSRs from each of the multiple remote UEs 115 into the DSR 301 (e.g., group based DSR) and transmit the DSR 301 to the network entity 105.

To distinguish between the DSRs for each remote UE 115, an octet 310-*a* (e.g., the first octet 310) of the DSR 301 may be a bitmap associated with each UE 115. As an illustrative example, the LSB of the octet 310-*a* may correspond to a UE 115-*e*, while a second bit of the octet 310-*a* may correspond to a UE 115-*f*. Further, a third bit of the octet 310-*a* may correspond to a UE 115-*g*, while the MSB of the octet 310-*a* may correspond to a UE 115-*h*. In such examples, the network entity 105 and the relay UE 115 may coordinate in order to assign, or otherwise allocate, the bit positions for each remote UE 115.

Thus, in response to receiving the DSRs from each remote UE 115, the relay UE 115 may concatenate each of the DSRs into the DSR 301 and set the corresponding bits in the octet 310-*a* to a logical '1', such that the network entity 105 may have an indication which remote UEs 115 transmitted the DSRs.

In some examples, the relay UE 115 may report each DSR for the respective remote UEs 115 via at least one octet. As illustrated, the relay UE 115 may transmit the DSR for the UE 115-*e* via an octet 310-*b* of the DSR 301, transmit the DSR for the UE 115-*f* via an octet 310-*c* of the DSR 301, transmit the DSR for the UE 115-*g* via an octet 310-*d*, transmit the DSR for the UE 115-*h* via the octet 310-*e*, or the like. Although illustrated that each DSR for the respective remote UEs 115 are transmitted via a single octet 310, it should be understood that the relay UE 115 may use any quantity of octets 310 for transmission of a single DSR in the DSR 301.

Figure 4:
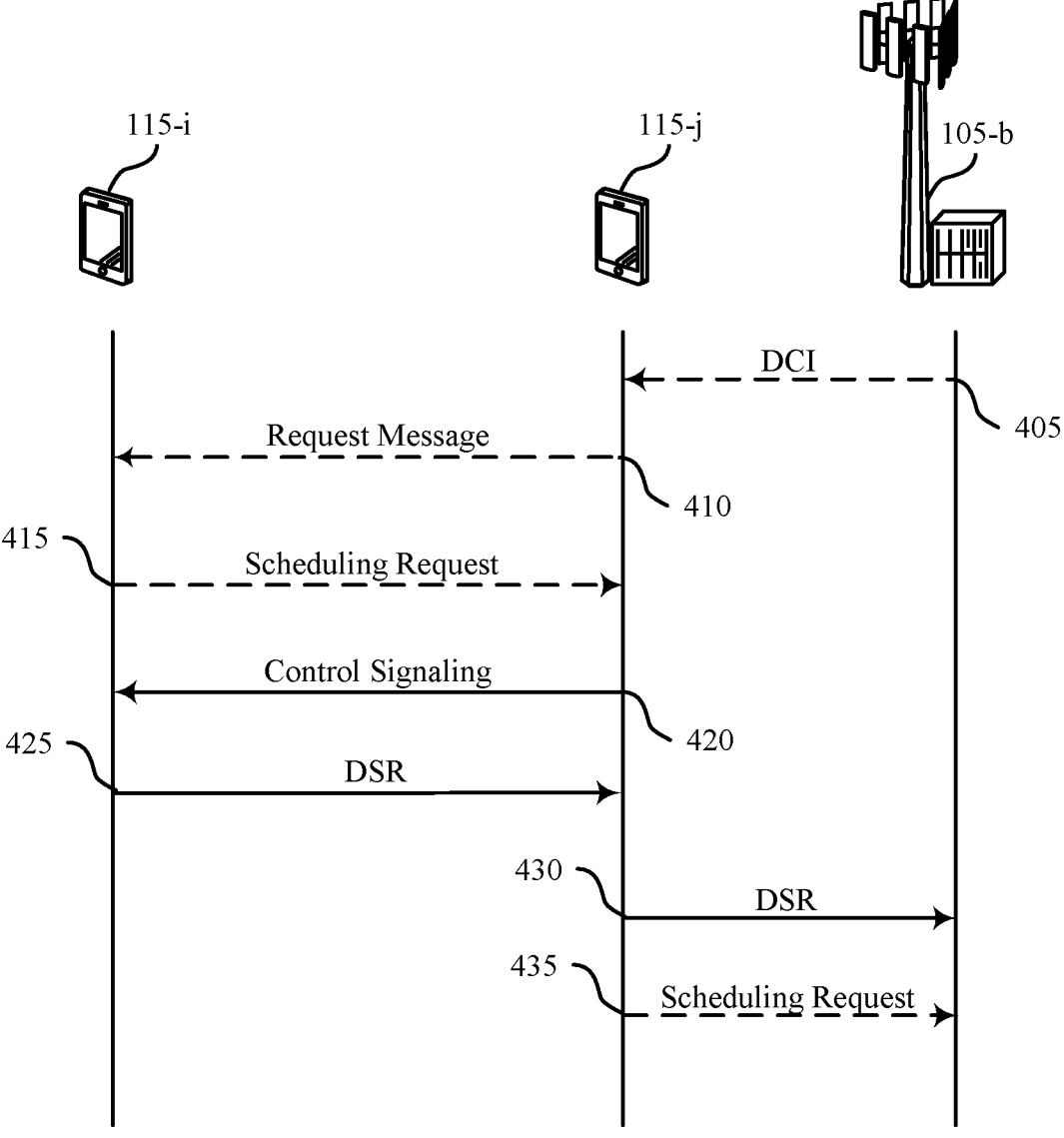
FIG. 4 shows an example of a process flow that supports techniques for delay status reporting via sidelinks in accordance with one or more aspects of the present disclosure.

FIG. 4 shows an example of a process flow 400 that supports techniques for delay status reporting via sidelinks in accordance with one or more aspects of the present disclosure. Aspects of the process flow 400 may implement, or be implemented by, aspects of the wireless communications system 100, the wireless communications system 200, the DSR 300, and the DSR 301 as described herein with reference to FIGS. 1 through 3B. The process flow 400 may include a UE 115-*i*, a UE 115-*j*, and a network entity 105-*b*, which may be examples of corresponding devices as described herein. For example, the UE 115-*j* may be an example of a relay UE (e.g., the UE 115-*a*), while the UE 115-*i* may be an example of a remote UE (e.g., the UE 115-*b* or the UE 115-*c*). The techniques described in the context of the process flow 400 may enable the UE 115-*i* to indicate a DSR to the network entity 105-*b* via the UE 115-*j*.

At 405, the network entity 105-*b* may optionally transmit, to the UE 115-*j*. DCI requesting a DSR from the UE 115-*i*. In such examples, the DCI may indicate a set of sidelink resources for transmission of the DSR from the UE 115-*i* to the UE 115-*j*, a set of uplink resources for the forwarding of the DSR from the UE 115-*j* to the network entity 105-*b*, or both. As described herein with reference to FIG. 2, the DSR may indicate a RDB for a PDU session associated with an LCG between the UE 115-*i* and the UE 115-*j*, where the RDB may be the difference between the PDB of the PDU session and a quantity of elapsed time from reception of the PDU session at the uplink buffer of the UE 115-*i*.

In some examples, at 410, the UE 115-*j* may transmit a request message to the UE 115-*i* indicating for the UE 115-*i* to transmit the DSR. In such examples, the UE 115-*j* may indicate, via the request message, a request for which LCG the UE 115-*i* is to report. For example, the network entity 105-*b* may indicate, via the DCI at 405, or other control signaling, a request for DSR associated with a first LCG. In response to receiving such a request, the UE 115-*j* may transmit the request message to the UE 115-*i* indicating that the UE 115-*i* is to transmit the DSR for the requested first LCG. In some examples, the UE 115-*j* may transmit the request message in response to receiving the DCI at 405. Alternatively, the UE 115-*j* may transmit the request message independent of the reception of the DCI at 405.

Additionally, or alternatively, at 415, the UE 115-*i* may transmit a scheduling request for the set of sidelink resources for transmission of the DSR from the UE 115-*i* to the UE 115-*j*. For example, the UE 115-*i* may trigger the transmission of the DSR based on the RDB of the PDU session of the LCG satisfying (e.g., being greater) than an RDB threshold. In some other examples, the UE 115-*i* may trigger the scheduling request for transmission of the DSR based on expiration of a periodic timer for DSR transmissions. In some examples, the UE 115-*i* may trigger, by requesting the set of sidelink resources, the transmission of the DSR based on a PER of the PDU session satisfying a PER threshold, a quantity of discarded packets associated with the LCG satisfying a threshold quantity of discarded packets, or both. In such examples, the UE 115-*i* may receive an indication of the respective thresholds via control messaging from the UE 115-*j*, the network entity 105-*b*, or both. Alternatively, such thresholds may be predefined or preconfigured in a standard.

At 420, the UE 115-*j* may transmit control signaling indicating the set of sidelink resources for transmission of the DSR from the UE 115-*i* to the UE 115-*j*. In some examples, if operating in a first sidelink mode (e.g., sidelink mode 1), the UE 115-*j* may indicate the sidelink resources received via the DCI to the UE 115-*i*. That is, the network entity 105-*b* may schedule the sidelink resources. Alternatively, if operating in a second sidelink mode (e.g., sidelink mode 2), the UE 115-*j* may autonomously schedule the sidelink resources for transmission of the DSR. In such examples, the set of sidelink resources may be periodic, aperiodic, semi-static, or the like. As described herein, in some examples, the UE 115-*j* may transmit the control signaling to multiple relay UEs as described herein with reference to FIG. 2. In some examples, the UE 115-*j* may transmit the control signaling in response to receiving the DCI, transmitting the request message, or receiving the scheduling request.

At 425, the UE 115-*i* may transmit, to the UE 115-*j* and via the set of sidelink resources, the DSR for the requested LCG between the UE 115-*i* and the network entity 105-*b*. Further, in some examples, the UE 115-*j* may receive multiple DSRs from multiple relay UEs.

At 430, the UE 115-*j* may transmit the DSR received from the UE 115-*i* to the network entity 105-*b* via a set of uplink resources. In some examples, the UE 115-*j* may receive an uplink grant indicating the set of uplink resources for transmission of the DSR. Alternatively, the UE 115-*j* may use the set of uplink resources received via the DCI at 405. If the UE 115-*j* receives multiple DSRs from multiple relay UEs, then the UE 115-*j* may transmit each DSR via a separate uplink message. Alternatively, the UE 115-*j* may concatenate each DSR into a single group based DSR, as described herein with reference to FIG. 3B, and transmit the group based DSR to the network entity 105-*b*.

A 435, in some examples, in response to receiving the DSR from the UE 115-*i*, the UE 115-*j* may transmit scheduling request to request sidelink resources for communications between the UE 115-*i* and the UE 115-*j*, request uplink resources for communications between the UE 115-*j* and the network entity 105-*b*, or both. That is, the reception of the DSR from the UE 115-*i* may be a trigger for transmission of the scheduling request from the UE 115-*j* to the network entity 105-*b*.

In response to receiving the DSR, the network entity 105-*b* may schedule resources for the relay communication between the UE 115-*i* and the network entity 105-*b* for the PDU session associated with the LCG, such that the UE 115-*i* may communicate the uplink data to the network entity 105-*b* and meet the latency metrics for the PDU session.

Figure 5:
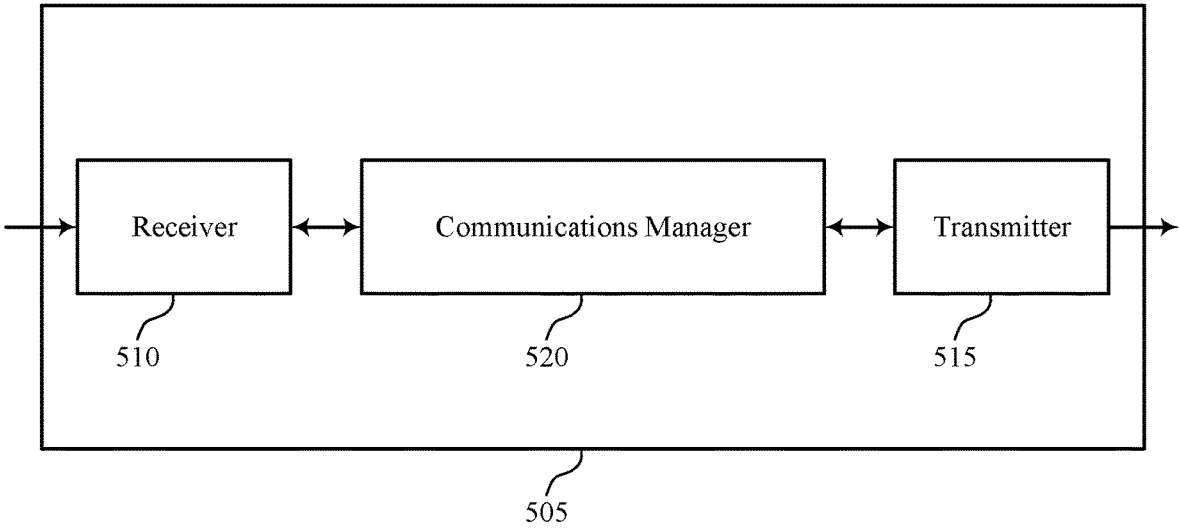
FIGS. 5 and 6 show block diagrams of devices that support techniques for delay status reporting via sidelinks in accordance with one or more aspects of the present disclosure.

FIG. 5 shows a block diagram 500 of a device 505 that supports techniques for delay status reporting via sidelinks in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for delay status reporting via sidelinks). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for delay status reporting via sidelinks). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for delay status reporting via sidelinks as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a relay UE in accordance with examples as disclosed herein. For example, the communications manager 520 is capable of, configured to, or operable to support a means for transmitting control signaling indicating a set of sidelink resources for transmission of one or more DSRs from one or more remote UEs to the relay UE. The communications manager 520 is capable of, configured to, or operable to support a means for receiving, via the set of sidelink resources, a first sidelink message including a first DSR from a first remote UE, the first DSR being associated with a first LCH between the first remote UE and a network entity. The communications manager 520 is capable of, configured to, or operable to support a means for transmitting, to the network entity via a set of uplink resources, an uplink message including the first DSR.

Additionally, or alternatively, the communications manager 520 may support wireless communications at a remote UE in accordance with examples as disclosed herein. For example, the communications manager 520 is capable of, configured to, or operable to support a means for receiving control signaling indicating a set of sidelink resources for communications between the remote UE and a relay UE, the set of sidelink resources for transmission of a DSR associated with a LCH between the remote UE and a network entity. The communications manager 520 is capable of, configured to, or operable to support a means for transmitting, to the relay UE via the set of sidelink resources, a sidelink message including the DSR based on receiving the control signaling.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for a relay UE to forward DSR from multiple remote UEs to a network entity, such the network entity to schedule sidelink resources for the remote UEs based on the DSRs, thereby providing for a more efficient utilization of communication resources.

Figure 6:
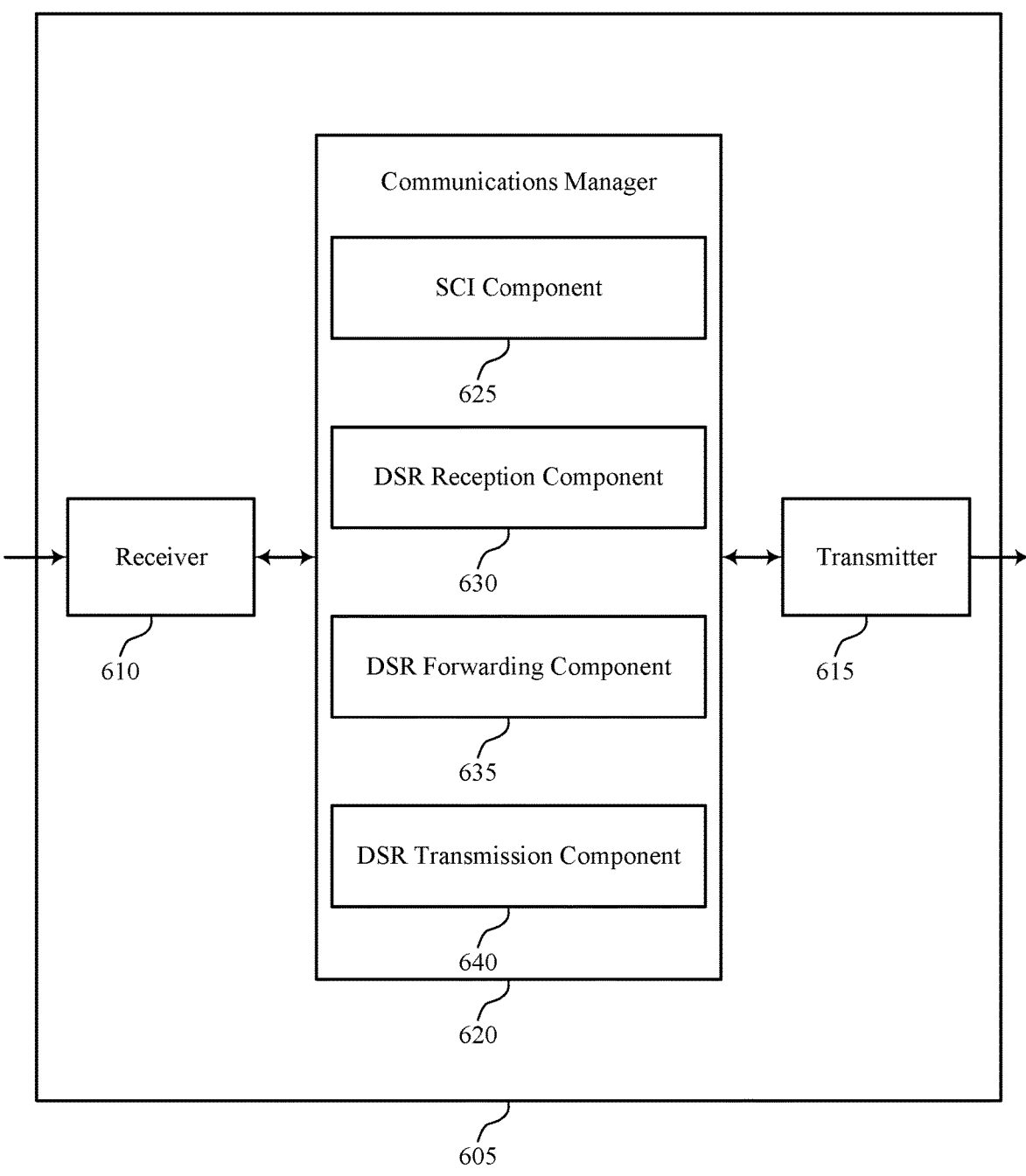

FIG. 6 shows a block diagram 600 of a device 605 that supports techniques for delay status reporting via sidelinks in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for delay status reporting via sidelinks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for delay status reporting via sidelinks). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for delay status reporting via sidelinks as described herein. For example, the communications manager 620 may include an SCI component 625, a DSR reception component 630, a DSR forwarding component 635, a DSR transmission component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a relay UE in accordance with examples as disclosed herein. The SCI component 625 is capable of, configured to, or operable to support a means for transmitting control signaling indicating a set of sidelink resources for transmission of one or more DSRs from one or more remote UEs to the relay UE. The DSR reception component 630 is capable of, configured to, or operable to support a means for receiving, via the set of sidelink resources, a first sidelink message including a first DSR from a first remote UE, the first DSR being associated with a first LCH between the first remote UE and a network entity. The DSR forwarding component 635 is capable of, configured to, or operable to support a means for transmitting, to the network entity via a set of uplink resources, an uplink message including the first DSR.

Additionally, or alternatively, the communications manager 620 may support wireless communications at a remote UE in accordance with examples as disclosed herein. The SCI component 625 is capable of, configured to, or operable to support a means for receiving control signaling indicating a set of sidelink resources for communications between the remote UE and a relay UE, the set of sidelink resources for transmission of a DSR associated with a LCH between the remote UE and a network entity. The DSR transmission component 640 is capable of, configured to, or operable to support a means for transmitting, to the relay UE via the set of sidelink resources, a sidelink message including the DSR based on receiving the control signaling.

Figure 7:
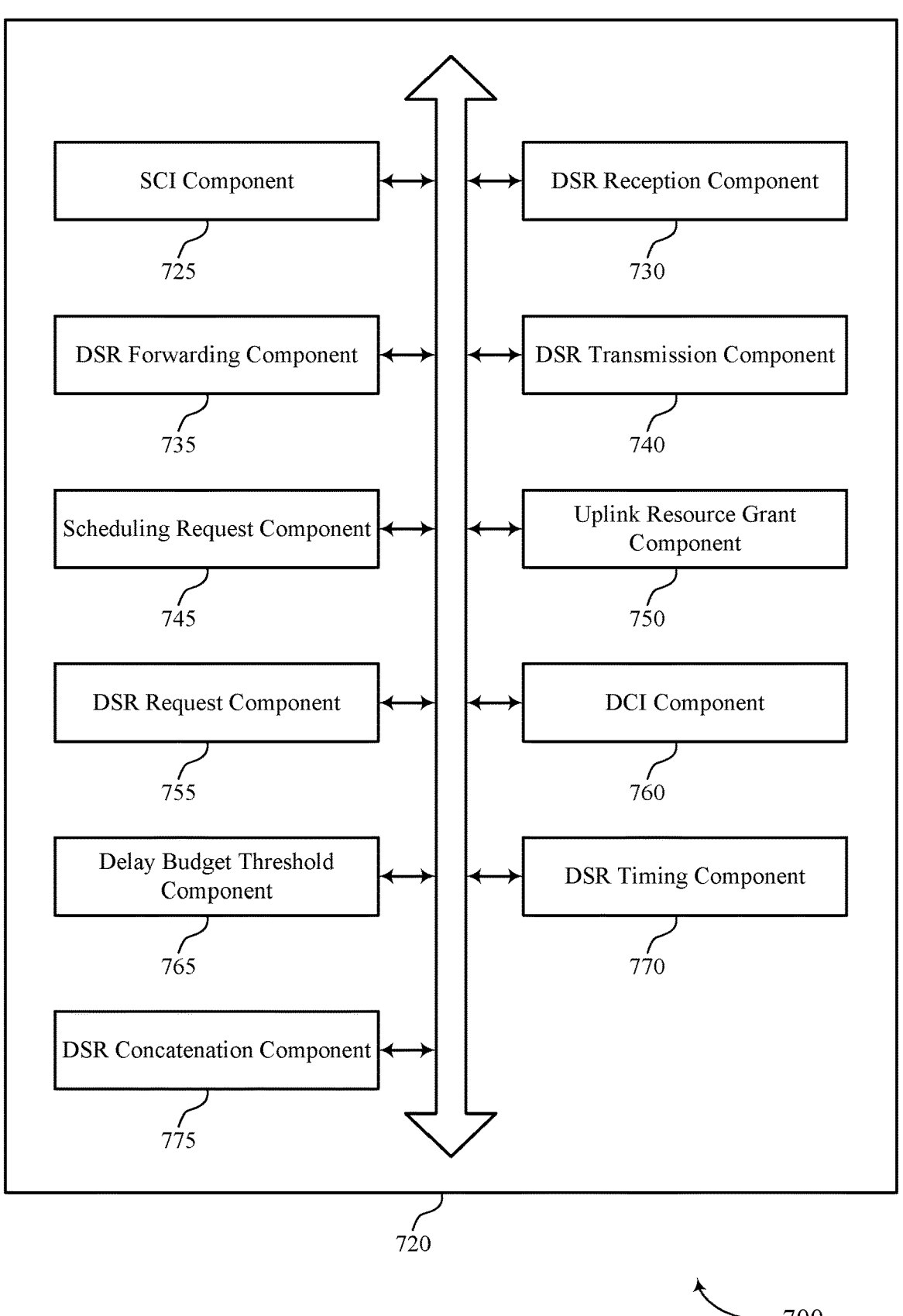
FIG. 7 shows a block diagram of a communications manager that supports techniques for delay status reporting via sidelinks in accordance with one or more aspects of the present disclosure.

FIG. 7 shows a block diagram 700 of a communications manager 720 that supports techniques for delay status reporting via sidelinks in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for delay status reporting via sidelinks as described herein. For example, the communications manager 720 may include an SCI component 725, a DSR reception component 730, a DSR forwarding component 735, a DSR transmission component 740, a scheduling request component 745, an uplink resource grant component 750, a DSR request component 755, a DCI component 760, a delay budget threshold component 765, a DSR timing component 770, a DSR concatenation component 775, or any combination thereof. Each of these components, or components or subcomponents thereof (e.g., one or more processors, one or more memories), may communicate, directly or indirectly, with one another (e.g., via one or more buses).

The communications manager 720 may support wireless communications at a relay UE in accordance with examples as disclosed herein. The SCI component 725 is capable of, configured to, or operable to support a means for transmitting control signaling indicating a set of sidelink resources for transmission of one or more DSRs from one or more remote UEs to the relay UE. The DSR reception component 730 is capable of, configured to, or operable to support a means for receiving, via the set of sidelink resources, a first sidelink message including a first DSR from a first remote UE, the first DSR being associated with a first LCH between the first remote UE and a network entity. The DSR forwarding component 735 is capable of, configured to, or operable to support a means for transmitting, to the network entity via a set of uplink resources, an uplink message including the first DSR.

In some examples, the scheduling request component 745 is capable of, configured to, or operable to support a means for transmitting, to the network entity, a scheduling request for a second set of sidelink resources between the relay UE and the first remote UE based on the first DSR satisfying a DSR threshold.

In some examples, transmitting the uplink message including the first DSR is based on the first DSR satisfying the DSR threshold.

In some examples, the DSR reception component 730 is capable of, configured to, or operable to support a means for receiving, via the set of sidelink resources, a second sidelink message including a second DSR from a second remote UE, the second DSR associated with a second LCH between the second remote UE and the network entity.

In some examples, the DSR forwarding component 735 is capable of, configured to, or operable to support a means for transmitting, via the set of uplink resources, a second uplink message including the second DSR to the network entity.

In some examples, to support transmitting the uplink message, the DSR concatenation component 775 is capable of, configured to, or operable to support a means for transmitting, to the network entity, a MAC-CE including a concatenation of the first DSR and the second DSR.

In some examples, the uplink resource grant component 750 is capable of, configured to, or operable to support a means for receiving, from the network entity, an uplink grant indicating the set of uplink resources, where transmitting the uplink message including the first DSR is based on receiving the uplink grant.

In some examples, the DSR request component 755 is capable of, configured to, or operable to support a means for transmitting, to the first remote UE, a request message indicating for the first remote UE to transmit the first DSR, where receiving the first sidelink message including the first DSR is in response to transmitting the request message.

In some examples, the request message further indicates that the first DSR is for the first LCH.

In some examples, the DCI component 760 is capable of, configured to, or operable to support a means for receiving DCI requesting the first DSR from the first remote UE, the DCI including the set of sidelink resources, the set of uplink resources, or both, where transmitting the control signaling is based on receiving the DCI.

In some examples, the set of sidelink resources are periodic.

In some examples, the first DSR indicates at least a RDB for a PDU session associated with the first LCH at the first remote UE, and the RDB is a difference between a packet delay budget of the PDU session and a quantity of elapsed time from reception of the PDU session at an uplink buffer of the first remote UE.

Additionally, or alternatively, the communications manager 720 may support wireless communications at a remote UE in accordance with examples as disclosed herein. In some examples, the SCI component 725 is capable of, configured to, or operable to support a means for receiving control signaling indicating a set of sidelink resources for communications between the remote UE and a relay UE, the set of sidelink resources for transmission of a DSR associated with a LCH between the remote UE and a network entity. The DSR transmission component 740 is capable of, configured to, or operable to support a means for transmitting, to the relay UE via the set of sidelink resources, a sidelink message including the DSR based on receiving the control signaling.

In some examples, the DSR request component 755 is capable of, configured to, or operable to support a means for receiving, from the relay UE, a request message indicating for the remote UE to transmit the DSR, where transmitting the sidelink message including the DSR is in response to receiving the request message.

In some examples, the request message further indicates that the DSR is for the LCH.

In some examples, the scheduling request component 745 is capable of, configured to, or operable to support a means for transmitting, to the relay UE, a scheduling request for the set of sidelink resources, where receiving the control signaling is in response to transmitting the scheduling request.

In some examples, the delay budget threshold component 765 is capable of, configured to, or operable to support a means for receiving an indication of a RDB threshold, where transmitting the sidelink message including the DSR is based on a RDB of a PDU session of the LCH satisfying the RDB threshold.

In some examples, the DSR timing component 770 is capable of, configured to, or operable to support a means for receiving an indication of a periodic timer associated with the transmission of the DSR, where transmitting the sidelink message including the DSR is based on expiration of the periodic timer.

In some examples, transmitting the sidelink message including the DSR is based on a packet error rate associated with the LCH satisfying a packet error rate threshold, a quantity of discarded packets associated with the LCH satisfying a threshold quantity of discarded packets, or both.

In some examples, the set of sidelink resources are periodic.

In some examples, the DSR indicates at least a RDB for a PDU session associated with the LCH at the remote UE, and the RDB is a difference between a packet delay budget of the PDU session and a quantity of elapsed time from reception of the PDU session at an uplink buffer of the remote UE.

Figure 8:
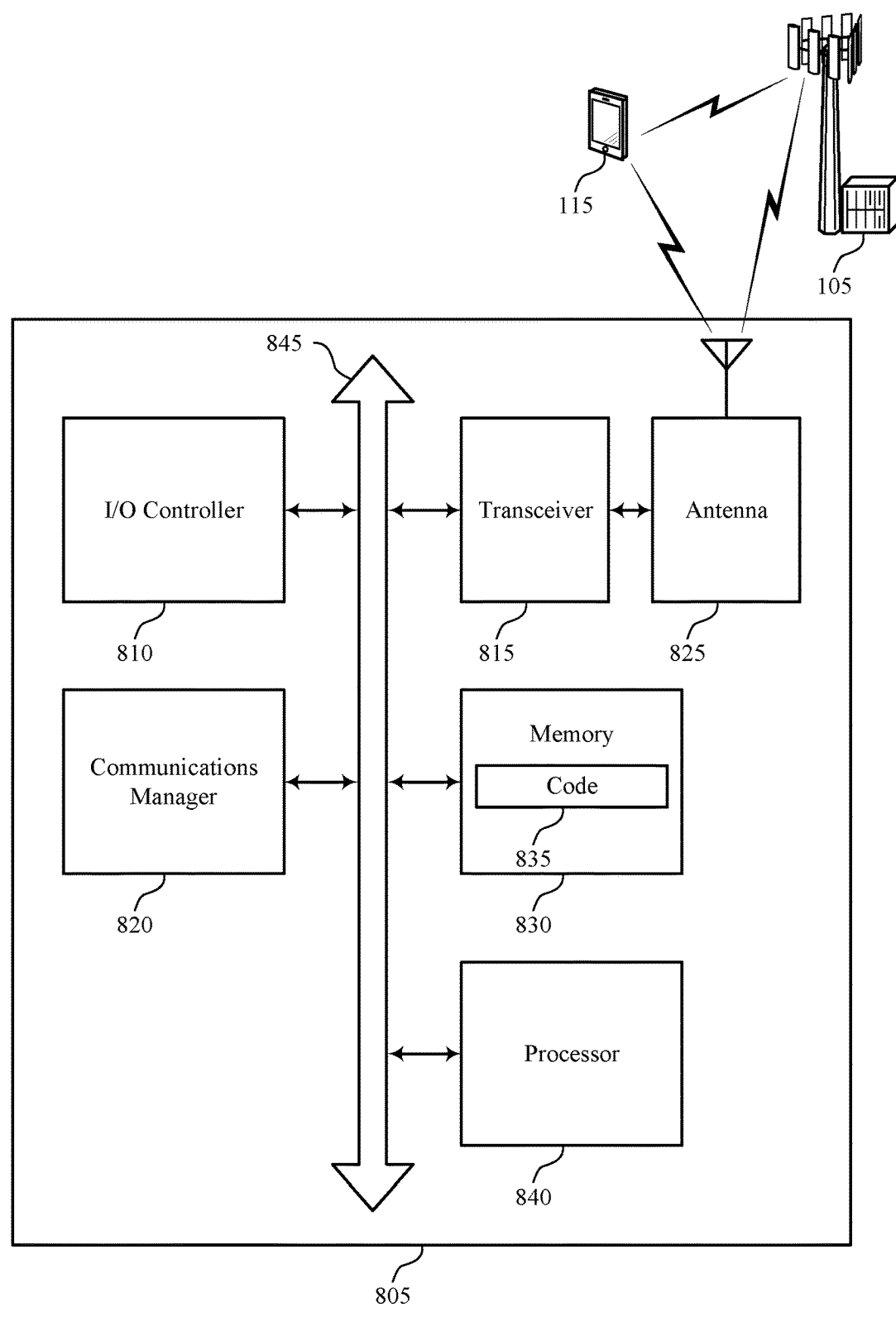
FIG. 8 shows a diagram of a system including a device that supports techniques for delay status reporting via sidelinks in accordance with one or more aspects of the present disclosure.

FIG. 8 shows a diagram of a system 800 including a device 805 that supports techniques for delay status reporting via sidelinks in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting techniques for delay status reporting via sidelinks). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications at a relay UE in accordance with examples as disclosed herein. For example, the communications manager 820 is capable of, configured to, or operable to support a means for transmitting control signaling indicating a set of sidelink resources for transmission of one or more DSRs from one or more remote UEs to the relay UE. The communications manager 820 is capable of, configured to, or operable to support a means for receiving, via the set of sidelink resources, a first sidelink message including a first DSR from a first remote UE, the first DSR being associated with a first LCH between the first remote UE and a network entity. The communications manager 820 is capable of, configured to, or operable to support a means for transmitting, to the network entity via a set of uplink resources, an uplink message including the first DSR.

Additionally, or alternatively, the communications manager 820 may support wireless communications at a remote UE in accordance with examples as disclosed herein. For example, the communications manager 820 is capable of, configured to, or operable to support a means for receiving control signaling indicating a set of sidelink resources for communications between the remote UE and a relay UE, the set of sidelink resources for transmission of a DSR associated with a LCH between the remote UE and a network entity. The communications manager 820 is capable of, configured to, or operable to support a means for transmitting, to the relay UE via the set of sidelink resources, a sidelink message including the DSR based on receiving the control signaling.

By including or configuring the communications manager 820 in accordance with examples as described herein, the device 805 may support techniques for a relay UE to forward DSR (DSRs) from multiple remote UEs to a network entity, such the network entity to schedule sidelink resources for the remote UEs based on the DSRs, thereby providing for a more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of techniques for delay status reporting via sidelinks as described herein, or the at least one processor 840 and the at least one memory 830 may be otherwise configured to, individually or collectively, perform or support such operations.

FIG. 9 shows a flowchart illustrating a method 900 that supports techniques for delay status reporting via sidelinks in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include transmitting control signaling indicating a set of sidelink resources for transmission of one or more DSRs from one or more remote UEs to the relay UE. The operations of block 905 may be performed in accordance with examples as disclosed herein. In some examples, aspects of the operations of 905 may be performed by an SCI component 725 as described with reference to FIG. 7.

At 910, the method may include receiving, via the set of sidelink resources, a first sidelink message including a first DSR from a first remote UE, the first DSR being associated with a first LCH between the first remote UE and a network entity. The operations of block 910 may be performed in accordance with examples as disclosed herein. In some examples, aspects of the operations of 910 may be performed by a DSR reception component 730 as described with reference to FIG. 7.

At 915, the method may include transmitting, to the network entity via a set of uplink resources, an uplink message including the first DSR. The operations of block 915 may be performed in accordance with examples as disclosed herein. In some examples, aspects of the operations of 915 may be performed by a DSR forwarding component 735 as described with reference to FIG. 7.

FIG. 10 shows a flowchart illustrating a method 1000 that supports techniques for delay status reporting via sidelinks in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include transmitting control signaling indicating a set of sidelink resources for transmission of one or more DSRs from one or more remote UEs to the relay UE. The operations of block 1005 may be performed in accordance with examples as disclosed herein. In some examples, aspects of the operations of 1005 may be performed by an SCI component 725 as described with reference to FIG. 7.

At 1010, the method may include transmitting, to the first remote UE, a request message indicating for the first remote UE to transmit the first DSR, where receiving the first sidelink message including the first DSR is in response to transmitting the request message. The operations of block 1010 may be performed in accordance with examples as disclosed herein. In some examples, aspects of the operations of 1010 may be performed by a DSR request component 755 as described with reference to FIG. 7.

At 1015, the method may include receiving, via the set of sidelink resources, a first sidelink message including a first DSR from a first remote UE, the first DSR being associated with a first LCH between the first remote UE and a network entity. The operations of block 1015 may be performed in accordance with examples as disclosed herein. In some examples, aspects of the operations of 1015 may be performed by a DSR reception component 730 as described with reference to FIG. 7.

At 1020, the method may include transmitting, to the network entity via a set of uplink resources, an uplink message including the first DSR. The operations of block 1020 may be performed in accordance with examples as disclosed herein. In some examples, aspects of the operations of 1020 may be performed by a DSR forwarding component 735 as described with reference to FIG. 7.

FIG. 11 shows a flowchart illustrating a method 1100 that supports techniques for delay status reporting via sidelinks in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving control signaling indicating a set of sidelink resources for communications between the remote UE and a relay UE, the set of sidelink resources for transmission of a DSR associated with a LCH between the remote UE and a network entity. The operations of block 1105 may be performed in accordance with examples as disclosed herein. In some examples, aspects of the operations of 1105 may be performed by an SCI component 725 as described with reference to FIG. 7.

At 1110, the method may include transmitting, to the relay UE via the set of sidelink resources, a sidelink message including the DSR based on receiving the control signaling. The operations of block 1110 may be performed in accordance with examples as disclosed herein. In some examples, aspects of the operations of 1110 may be performed by a DSR transmission component 740 as described with reference to FIG. 7.

FIG. 12 shows a flowchart illustrating a method 1200 that supports techniques for delay status reporting via sidelinks in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving control signaling indicating a set of sidelink resources for communications between the remote UE and a relay UE, the set of sidelink resources for transmission of a DSR associated with a LCH between the remote UE and a network entity. The operations of block 1205 may be performed in accordance with examples as disclosed herein. In some examples, aspects of the operations of 1205 may be performed by an SCI component 725 as described with reference to FIG. 7.

At 1210, the method may include receiving, from the relay UE, a request message indicating for the remote UE to transmit the DSR, where transmitting the sidelink message including the DSR is in response to receiving the request message. The operations of block 1210 may be performed in accordance with examples as disclosed herein. In some examples, aspects of the operations of 1210 may be performed by a DSR request component 755 as described with reference to FIG. 7.

At 1215, the method may include transmitting, to the relay UE via the set of sidelink resources, a sidelink message including the DSR based on receiving the control signaling. The operations of block 1215 may be performed in accordance with examples as disclosed herein. In some examples, aspects of the operations of 1215 may be performed by a DSR transmission component 740 as described with reference to FIG. 7.

The following provides an overview of aspects of the present disclosure:

Aspect 1: A method for wireless communications at a relay UE, comprising: transmitting control signaling indicating a set of sidelink resources for transmission of one or more DSRs from one or more remote UEs to the relay UE; receiving, via the set of sidelink resources, a first sidelink message including a first DSR from a first remote UE, the first DSR being associated with a first LCH between the first remote UE and a network entity; and transmitting, to the network entity via a set of uplink resources, an uplink message including the first DSR.

Aspect 2: The method of aspect 1, further comprising: transmitting, to the network entity, a scheduling request for a second set of sidelink resources between the relay UE and the first remote UE based at least in part on the first DSR satisfying a DSR threshold.

Aspect 3: The method of aspect 2, wherein transmitting the uplink message including the first DSR is based at least in part on the first DSR satisfying the DSR threshold.

Aspect 4: The method of any of aspects 1 through 3, further comprising: receiving, via the set of sidelink resources, a second sidelink message including a second DSR from a second remote UE, the second DSR associated with a second LCH between the second remote UE and the network entity.

Aspect 5: The method of aspect 4, further comprising: transmitting, via the set of uplink resources, a second uplink message including the second DSR to the network entity.

Aspect 6: The method of any of aspects 4 through 5, wherein transmitting the uplink message comprises: transmitting, to the network entity, a MAC-CE including a concatenation of the first DSR and the second DSR.

Aspect 7: The method of any of aspects 1 through 6, further comprising: receiving, from the network entity, an uplink grant indicating the set of uplink resources, wherein transmitting the uplink message including the first DSR is based at least in part on receiving the uplink grant.

Aspect 8: The method of any of aspects 1 through 7, further comprising: transmitting, to the first remote UE, a request message indicating for the first remote UE to transmit the first DSR, wherein receiving the first sidelink message including the first DSR is in response to transmitting the request message.

Aspect 9: The method of aspect 8, wherein the request message further indicates that the first DSR is for the first LCH.

Aspect 10: The method of any of aspects 1 through 9, further comprising: receiving DCI requesting the first DSR from the first remote UE, the DCI including the set of sidelink resources, the set of uplink resources, or both, wherein transmitting the control signaling is based at least in part on receiving the DCI.

Aspect 11: The method of any of aspects 1 through 10, wherein the set of sidelink resources are periodic.

Aspect 12: The method of any of aspects 1 through 11, wherein the first DSR indicates at least a RDB for a PDU session associated with the first LCH at the first remote UE, and the RDB is a difference between a packet delay budget of the PDU session and a quantity of elapsed time from reception of the PDU session at an uplink buffer of the first remote UE.

Aspect 13: A method for wireless communications at a remote UE, comprising: receiving control signaling indicating a set of sidelink resources for communications between the remote UE and a relay UE, the set of sidelink resources for transmission of a DSR associated with a LCH between the remote UE and a network entity; and transmitting, to the relay UE via the set of sidelink resources, a sidelink message including the DSR based at least in part on receiving the control signaling.

Aspect 14: The method of aspect 13, further comprising: receiving, from the relay UE, a request message indicating for the remote UE to transmit the DSR, wherein transmitting the sidelink message including the DSR is in response to receiving the request message.

Aspect 15: The method of aspect 14, wherein the request message further indicates that the DSR is for the LCH.

Aspect 16: The method of any of aspects 13 through 15, further comprising: transmitting, to the relay UE, a scheduling request for the set of sidelink resources, wherein receiving the control signaling is in response to transmitting the scheduling request.

Aspect 17: The method of any of aspects 13 through 16, further comprising: receiving an indication of a RDB threshold, wherein transmitting the sidelink message including the DSR is based at least in part on a RDB of a PDU session of the LCH satisfying the RDB threshold.

Aspect 18: The method of any of aspects 13 through 17, further comprising: receiving an indication of a periodic timer associated with the transmission of the DSR, wherein transmitting the sidelink message including the DSR is based at least in part on expiration of the periodic timer.

Aspect 19: The method of any of aspects 13 through 18, wherein transmitting the sidelink message including the DSR is based at least in part on a packet error rate associated with the LCH satisfying a packet error rate threshold, a quantity of discarded packets associated with the LCH satisfying a threshold quantity of discarded packets, or both.

Aspect 20: The method of any of aspects 13 through 19, wherein the set of sidelink resources are periodic.

Aspect 21: The method of any of aspects 13 through 20, wherein the DSR indicates at least a RDB for a PDU session associated with the LCH at the remote UE, and the RDB is a difference between a packet delay budget of the PDU session and a quantity of elapsed time from reception of the PDU session at an uplink buffer of the remote UE.

Aspect 22: A relay UE for wireless communications, comprising one or more memories storing processor-executable code, and one or more processors coupled with the one or more memories and individually or collectively operable to execute the code to cause the relay UE to perform a method of any of aspects 1 through 12.

Aspect 23: A relay UE for wireless communications, comprising at least one means for performing a method of any of aspects 1 through 12.

Aspect 24: A non-transitory computer-readable medium storing code for wireless communications, the code comprising instructions executable by a processor to perform a method of any of aspects 1 through 12.

Aspect 25: A remote UE for wireless communications, comprising one or more memories storing processor-executable code, and one or more processors coupled with the one or more memories and individually or collectively operable to execute the code to cause the remote UE to perform a method of any of aspects 13 through 21.

Aspect 26: A remote UE for wireless communications, comprising at least one means for performing a method of any of aspects 13 through 21.

Aspect 27: A non-transitory computer-readable medium storing code for wireless communications, the code comprising instructions executable by a processor to perform a method of any of aspects 13 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A relay user equipment (UE) for wireless communication, comprising:
   one or more memories storing processor-executable code; and
   one or more processors coupled with the one or more memories and individually or collectively operable to execute the code to cause the relay UE:
      transmit control signaling indicating a set of sidelink resources for transmission of one or more delay status reports from one or more remote UEs to the relay UE;
      receive, via the set of sidelink resources, a first sidelink message including a first delay status report from a first remote UE, the first delay status report being associated with a first logical channel between the first remote UE and a network entity; and
      transmit, to the network entity via a set of uplink resources, an uplink message including the first delay status report.

2. The relay UE of claim 1, wherein the one or more processors are individually or collectively further operable to execute the code to cause the relay UE to:
   transmit, to the network entity, a scheduling request for a second set of sidelink resources between the relay UE and the first remote UE based at least in part on the first delay status report satisfying a delay status report threshold.

3. The relay UE of claim 2, wherein transmitting the uplink message including the first delay status report is based at least in part on the first delay status report satisfying the delay status report threshold.

4. The relay UE of claim 1, wherein the one or more processors are individually or collectively further operable to execute the code to cause the relay UE to:

receive, via the set of sidelink resources, a second sidelink message including a second delay status report from a second remote UE, the second delay status report associated with a second logical channel between the second remote UE and the network entity.

5. The relay UE of claim 4, wherein the one or more processors are individually or collectively further operable to execute the code to cause the relay UE to:

transmit, via the set of uplink resources, a second uplink message including the second delay status report to the network entity.

6. The relay UE of claim 4, wherein the one or more processors are individually or collectively further operable to execute the code to cause the relay UE to:

transmit, to the network entity, a medium access control-control element including a concatenation of the first delay status report and the second delay status report.

7. The relay UE of claim 1, wherein the one or more processors are individually or collectively further operable to execute the code to cause relay UE to:

receive, from the network entity, an uplink grant indicating the set of uplink resources, wherein transmitting the uplink message including the first delay status report is based at least in part on receiving the uplink grant.

8. The relay UE of claim 1, wherein the one or more processors are individually or collectively further operable to execute the code to cause the relay UE to:

transmit, to the first remote UE, a request message indicating for the first remote UE to transmit the first delay status report, wherein receiving the first sidelink message including the first delay status report is in response to transmitting the request message.

9. The relay UE of claim 8, wherein the request message further indicates that the first delay status report is for the first logical channel.

10. The relay UE of claim 1, wherein the one or more processors are individually or collectively further operable to execute the code to cause relay UE to:

receive downlink control information requesting the first delay status report from the first remote UE, the downlink control information including the set of sidelink resources, the set of uplink resources, or both, wherein transmitting the control signaling is based at least in part on receiving the downlink control information.

11. The relay UE of claim 1, wherein the set of sidelink resources are periodic.

12. The relay UE of claim 1, wherein the first delay status report indicates at least a remaining delay budget for a packet data unit session associated with the first logical channel at the first remote UE, and the remaining delay budget is a difference between a packet delay budget of the packet data unit session and a quantity of elapsed time from reception of the packet data unit session at an uplink buffer of the first remote UE.

13. A remote user equipment (UE) for wireless communication, comprising:

one or more memories storing processor-executable code; and one or more processors coupled with the one or more memories and individually or collectively operable to execute the code to cause the remote UE:

receive control signaling indicating a set of sidelink resources for communications between the remote UE and a relay UE, the set of sidelink resources for transmission of a delay status report associated with a logical channel between the remote UE and a network entity; and transmit, to the relay UE via the set of sidelink resources, a sidelink message including the delay status report based at least in part on receiving the control signaling.

14. The remote UE of claim 13, wherein the one or more processors are individually or collectively further operable to execute the code to cause the remote UE to:

receive, from the relay UE, a request message indicating for the remote UE to transmit the delay status report, wherein transmitting the sidelink message including the delay status report is in response to receiving the request message.

15. The remote UE of claim 14, wherein the request message further indicates that the delay status report is for the logical channel.

16. The remote UE of claim 13, wherein the one or more processors are individually or collectively further operable to execute the code to cause the remote UE to:

transmit, to the relay UE, a scheduling request for the set of sidelink resources, wherein receiving the control signaling is in response to transmitting the scheduling request.

17. The remote UE of claim 13, wherein the one or more processors are individually or collectively further operable to execute the code to cause the remote UE to:

receive an indication of a remaining delay budget threshold, wherein transmitting the sidelink message including the delay status report is based at least in part on a remaining delay budget of a packet data unit session of the logical channel satisfying the remaining delay budget threshold.

18. The remote UE of claim 13, wherein the one or more processors are individually or collectively further operable to execute the code to cause the remote UE to:

receive an indication of a periodic timer associated with the transmission of the delay status report, wherein transmitting the sidelink message including the delay status report is based at least in part on expiration of the periodic timer.

19. The remote UE of claim 13, wherein transmitting the sidelink message including the delay status report is based at least in part on a packet error rate associated with the logical channel satisfying a packet error rate threshold, a quantity of discarded packets associated with the logical channel satisfying a threshold quantity of discarded packets, or both.

20. The remote UE of claim 13, wherein the set of sidelink resources are periodic.

21. The remote UE of claim 13, wherein the delay status report indicates at least a remaining delay budget for a packet data unit session associated with the logical channel at the remote UE, and the remaining delay budget is a difference between a packet delay budget of the packet data unit session and a quantity of elapsed time from reception of the packet data unit session at an uplink buffer of the remote UE.

22. A method for wireless communications at a relay user equipment (UE), comprising:

transmitting control signaling indicating a set of sidelink resources for transmission of one or more delay status reports from one or more remote UEs to the relay UE;

receiving, via the set of sidelink resources, a first sidelink message including a first delay status report from a first remote UE, the first delay status report being associated with a first logical channel between the first remote UE and a network entity; and transmitting, to the network entity via a set of uplink resources, an uplink message including the first delay status report.

23. The method of claim 22, further comprising:

transmitting, to the network entity, a scheduling request for a second set of sidelink resources between the relay UE and the first remote UE based at least in part on the first delay status report satisfying a delay status report threshold.

24. The method of claim 23, wherein transmitting the uplink message including the first delay status report is based at least in part on the first delay status report satisfying the delay status report threshold.

25. The method of claim 22, further comprising:

receiving, via the set of sidelink resources, a second sidelink message including a second delay status report from a second remote UE, the second delay status report associated with a second logical channel between the second remote UE and the network entity.

26. The method of claim 25, further comprising:

transmitting, via the set of uplink resources, a second uplink message including the second delay status report to the network entity.

27. A method for wireless communications at a remote user equipment (UE), comprising:

receiving control signaling indicating a set of sidelink resources for communications between the remote UE and a relay UE, the set of sidelink resources for transmission of a delay status report associated with a logical channel between the remote UE and a network entity; and transmitting, to the relay UE via the set of sidelink resources, a sidelink message including the delay status report based at least in part on receiving the control signaling.

28. The method of claim 27, further comprising:

receiving, from the relay UE, a request message indicating for the remote UE to transmit the delay status report, wherein transmitting the sidelink message including the delay status report is in response to receiving the request message.

29. The method of claim 28, wherein the request message further indicates that the delay status report is for the logical channel.

30. The method of claim 27, further comprising:

transmitting, to the relay UE, a scheduling request for the set of sidelink resources, wherein receiving the control signaling is in response to transmitting the scheduling request.

* * * * *